US007184180B2

(12) United States Patent
Yasumaru

(10) Patent No.: US 7,184,180 B2
(45) Date of Patent: Feb. 27, 2007

(54) IMAGE FORMING APPARATUS, IMAGE FORMING METHOD AND PROGRAM, AND RECORDING MEDIUM

(75) Inventor: Ichiro Yasumaru, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 841 days.

(21) Appl. No.: 10/172,702

(22) Filed: Jun. 14, 2002

(65) Prior Publication Data

US 2002/0191209 A1 Dec. 19, 2002

(30) Foreign Application Priority Data

Jun. 19, 2001 (JP) ............................ 2001-184347
May 17, 2002 (JP) ............................ 2002-143516

(51) Int. Cl.
*H04N 1/32* (2006.01)
*H04N 1/04* (2006.01)

(52) U.S. Cl. ...................................... 358/468; 358/498

(58) Field of Classification Search ................ 358/449, 358/1.5, 498, 301, 487, 468; 101/401, 485; 347/19, 119

See application file for complete search history.

(56) References Cited

U.S. PATENT DOCUMENTS 4,956,704 A * 9/1990 Yamada ...................... 358/538
5,138,465 A * 8/1992 Ng et al. .................... 358/453
5,339,169 A * 8/1994 Meguro et al. ............. 358/403
5,475,475 A * 12/1995 Kohtani et al. ............... 399/79
5,754,213 A * 5/1998 Whritenor ................... 347/218
5,781,708 A * 7/1998 Austin et al. ................ 358/1.6
6,011,635 A * 1/2000 Bungo et al. ............... 358/488
6,262,814 B1 * 7/2001 Furukawa ................... 358/487
6,353,479 B1 * 3/2002 Lubawy et al. ............ 358/1.13
6,457,799 B1 * 10/2002 Kanome et al. .............. 347/19
6,963,411 B1 * 11/2005 Billow et al. .............. 358/1.13

* cited by examiner

*Primary Examiner*—Jerome Grant
(74) *Attorney, Agent, or Firm*—Fitzpatrick, Cella, Harper & Scinto

(57) ABSTRACT

An image forming apparatus is equipped with a sensor device that recognizes a recording material determination sections 130 formed on recording material 100, an acquisition device that acquires image information that may be stored in an information control server connected via the Internet based on a recognition result from the sensor device, and an image forming and controlling device that forms an image on the recording material 100 based on the image acquired by the acquisition device.

6 Claims, 16 Drawing Sheets

S (Adertisement Information Area) = (a/1) X 100

(c)

IMAGE FORMING APPARATUS, IMAGE FORMING METHOD AND PROGRAM, AND RECORDING MEDIUM

BACKGROUND OF THE INVENTION

1. Field of the Invention

The present invention relates to output control apparatuses, output control methods and programs, and recording medium, which can determine if image information such as advertisement information from advertisers can be written on recording material by identifying a recording material determination section formed on the recording material, and which can record image information on the recording material that is determined to be capable of printing such image information.

2. Description of Related Art

Conventionally, image forming apparatuses are set up such that individual image information and sentences that are processed by certain processing systems such as a personal computer designated by the user are transferred onto recording materials to prove the output desired by the user.

The user generally purchases the recording materials based on their needs. Specified recording materials are set in an image forming apparatus such as a laser-beam printer that transfers images on the recording materials or an ink-jet printer that forms images on the recording materials, whereby desired images are output onto the recording material.

Also, these recording materials can be purchased in different sizes, thickness, and surface conditions that match their designated usage, and one can decide which recording material to use based on the conditions planned by the user.

In the structure discussed above, however, one needs to purchase recording materials based on their planned usage. For instance, since recording materials that are used to output images particularly to view photographic images and recording materials that are used to output sentences have different usage, one has to purchase multiple types of recording materials.

In addition, as these recording materials vary in size according to their planned usage, one has to purchase even a greater number of different types of recording materials.

This is, however, problematic because recording materials which do not match the usage have to be often used as printing/recording materials due to economical inefficiencies of having to purchase different recording materials for different purposes and usage and difficulties in managing these materials.

In order to solve the problems described above, for example, a conventional system used in a color digital copier prints out on paper advertisement information stored in a storage device in the digital copier along with original images. However, there are problems in such a system. For instance, the users have to take the trouble to perform tasks such as designating a place to insert advertisement images on the recording paper, which has resulted in forcing the users to perform cumbersome processes.

SUMMARY OF THE INVENTION

The present invention has been made in view of the problems described above, and provides an apparatus that recognizes a recording material determination section formed in a recording material that is fed in the apparatus, obtains image information based on a result of the recognition, and forms an image representative of the image information obtains.

In accordance with an embodiment of the present invention, an image forming apparatus is equipped with a paper supply device that supplies recording materials from a paper feed section, a recognizing device that recognizes a recording material determination section formed in the recording material supplied by the paper supply device, an acquisition device that acquires second image information based on a recognition result from the recognition device, and an image forming control device that forms an image on the recording material based on the second image acquired by the acquisition device.

Other features and advantages of the invention will be apparent from the following detailed description, taken in conjunction with the accompanying drawings that illustrate, by way of example, various features of embodiments of the invention.

DETAIL DESCRIPTION OF THE INVENTION

Preferred embodiments of the present invention will be described in detail below with reference to the accompanying drawings. It is noted, however, that the size, material quality, form of components and their locations discussed in these embodiments are discusses as example and do not particularly limit the range of the present invention unless specifically noted. Also, in the figures below, the same components in the figures are indicated with the same reference numbers. In addition, descriptions for the image forming apparatus in each embodiment of the present invention will also be applicable to a server, image forming methods, image forming programs and computer-readable recording media that store image forming programs in accordance with embodiments of the present invention.

(First Embodiment)

First, an image forming apparatus in accordance with a first embodiment of the present invention will be described with reference to the figures. Also, in the following description, we will assume that images formed on recording material are images for advertisement. However, in the present invention, images that are formed by an image forming apparatus on recording material based on image information that is sent from a server are not limited to advertising images, and can be any images for other purposes.

As embodiments of the present invention, devices such as laser-beam printers and inkjet printers can be used in methods to record advertisement on recording materials. In the present embodiment, however, we will consider a model where laser-beam printers are used to record advertisement on recording materials. Also, a color image forming apparatus is used as an example to explain the embodiments. However, it is noted that the present invention is applicable to monochrome image forming apparatuses as well. In addition, the present invention can also be applied to multi-function apparatuses which are equipped with an output control apparatus which includes at least printer and fax functions.

Figure 1:
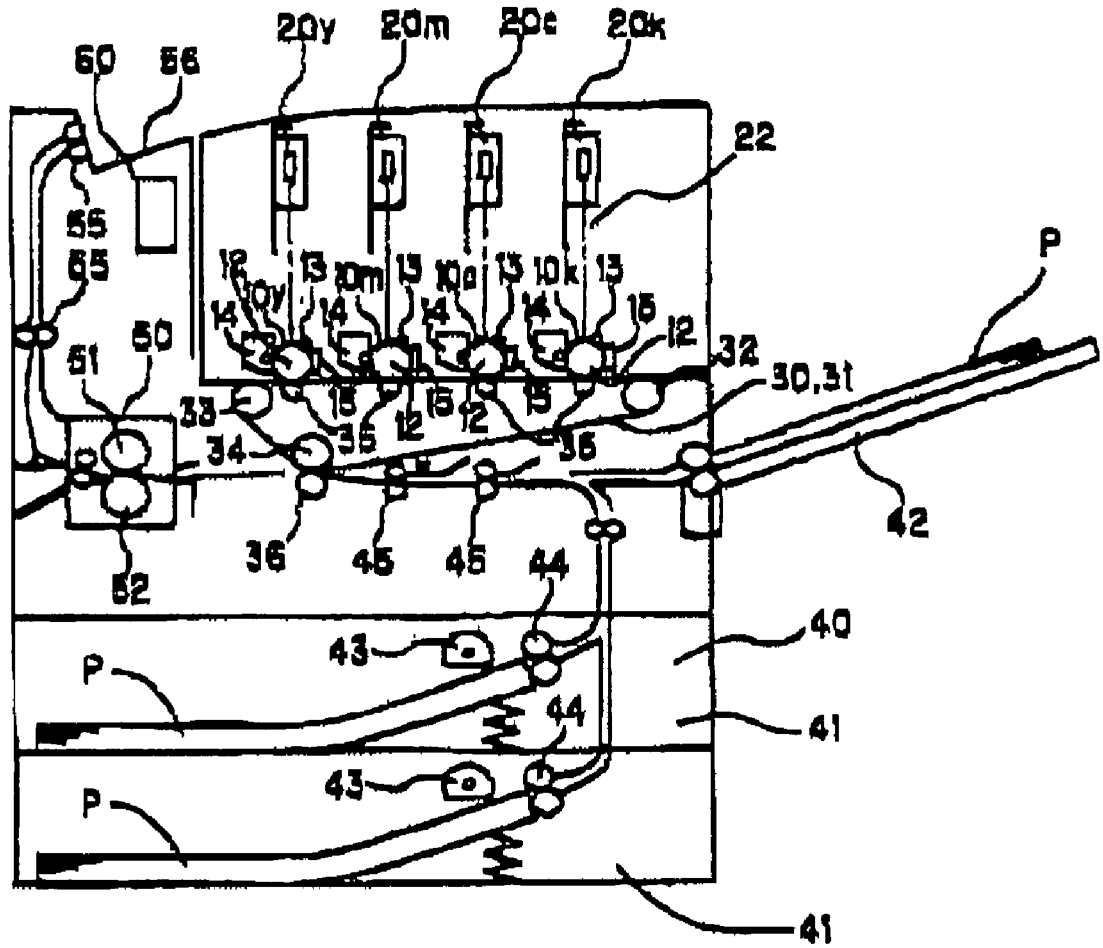
FIG. 1 schematically shows a cross section of a color image forming apparatus, which is an image forming apparatus in accordance with a first embodiment of the present invention.

FIGS. 1 through 11 show an image forming apparatus which is the first embodiment of the present invention. FIG. 1 shows a cross section of a color image forming apparatus (Output control apparatus), which is an image forming apparatus in The color image forming apparatus of the present embodiment is equipped with color process cartridges for four colors 10_y_, 10_m_, 10_c_, and 10_k_, which are components of the present invention, detachably mounted on corresponding image forming stations, optical units 20_y_, 20_m_, 20_c_, and 20_k_, which can emit laser beams, an intermediate transfer unit 30, a transferring material delivery unit 40, and a fixing unit 50. Each of the process cartridges 10_y_, 10_m_, 10_c_, and 10_k_ has the same construction and consists of a photosensitive drum 12 that is an electrophotographic photosensitive body, a charging device 13, a developing device 14 and a cleaning device 15. The number of process cartridges (10_y_, 10_m_, 10_c_, and 10_k_ in this embodiment) can be optionally increased or decreased depending on the requirements.

The intermediate transfer unit 30 is equipped with a transfer belt 31 which is an endless belt, three rollers 32, 33, and 34 which rotatably supports the transfer belt 31, primary transfer rollers 35 that transfer toner images formed on the photosensitive drums 12 to the transfer belt 31, and a secondary roller 36 that further transfers these toner images transferred on the transfer belt 31 onto a transferring material (i.e., a material on which information such as image, characters, etc., is transferred) p.

The transferring material delivery unit 40 is equipped with pick-up rollers 40 which deliver the transferring material p from paper feed cassettes 41 or a paper tray 42 to a secondary transfer region, paper supply rollers 44, delivery rollers 45 and resist rollers 46.

The fixing unit 50 is equipped with a fixing roller 51 and a pressurizing roller 52, which apply heat and pressure to fix the toner images on the transferring material p.

Furthermore, a control section 60 controls overall operations of the color image forming apparatus shown in FIG. 1.

In the structure above, with the first color, for example, “black” of the process cartridge 10_k_, a latent image is formed by the laser beam 22 which is emitted from the optical unit 20 on the photosensitive drum 12 that has been charged by the charging device 13, and this latent image is developed by the developing device 14 to form a toner image.

The toner image formed on the photosensitive drum 12 is transferred onto the transfer belt 31 by the primary transfer roller 35. After the primary transfer, the photosensitive drum 12 is cleaned by the cleaning device 15, and the toner image on the transfer belt 31 is fed to the next image forming process. A similar image forming process is performed at each of the process cartridges 10_y_, 10_m_, and 10_c_ (for yellow, magenta, and cyan, respectively) to thereby form toner images of the respective colors, which are successively transferred and superposed on top of the other.

In the mean time, the transferring material p is delivered to a secondary transfer region from the paper cassette 41 or the paper tray 42 by the transferring material delivery unit 40, and the toner images formed on the transfer belt 31 are transferred by the function of the secondary roller 36 onto the transferring material p. The transferring material p on which the toner images have been transferred is delivered to the fixing unit 50. Toner images are fixed at a nipping section between the fixing roller 51 and the pressurizing roller 52 and discharged onto the paper discharging tray 56 by the paper discharge roller 55.

Figure 2:
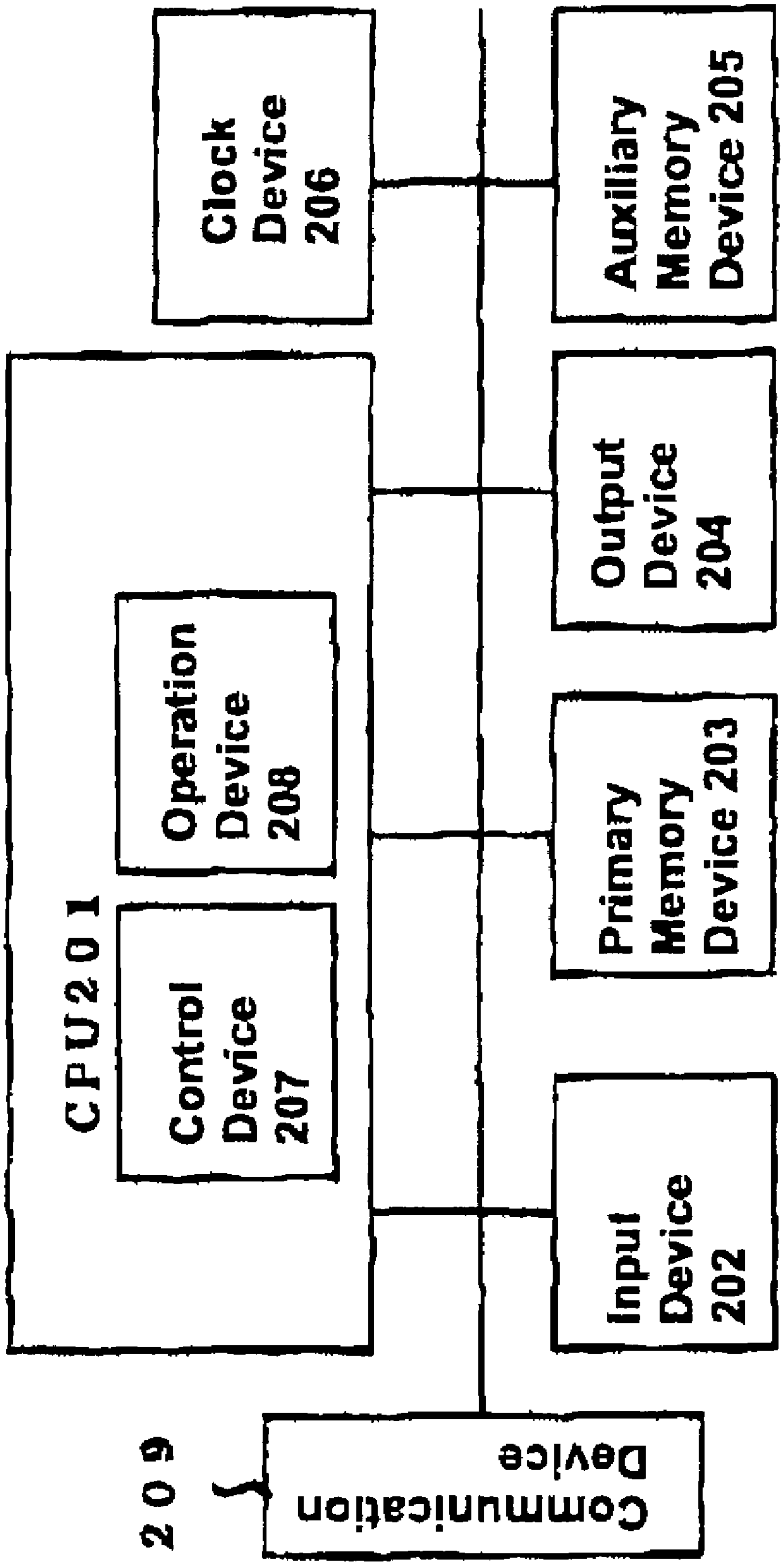
FIG. 2 is a block diagram of a controlling section 60 provided in the color image forming apparatus shown in FIG. 1.

Next, a structure of the controlling section 60 shown in FIG. 1 will be described with reference to FIG. 2. FIG. 2 is a block diagram of the controlling section 60 used in the color image forming apparatus shown in FIG. 1. As shown in FIG. 2, the controlling section 60 is formed from a central processing unit (CPU) 201, an input device 202, a primary memory device 203, an output device 204, an auxiliary memory device 205, a clock device 206, and a communication device 209. The CPU 201 is principally a processing device, and includes a controlling device 207 that sends commands to each device in the system and controls their operations and an operation device 208 that is an integral part of the controlling section 60 and performs operations of digital data.

The CPU 201 functions as an acquisition device and/or a detection, device which are components of the present invention, either by itself or in cooperation with the other parts shown in FIG. 2 or programs stored in the primary memory device 203 and the auxiliary memory device 205.

The controlling device 207, according to the clock timing generated by the clock device 206, reads data input from the input device 202 or predetermined procedures (i.e., program or software) into the primary memory device 203. Based on read contents, the controlling device 207 sends commands to the operating device 208 and makes it perform the operations. Results of this operating process are sent to internal equipment, such as the primary memory device 203, the output device 204 and the auxiliary memory device 205, or external equipment according to the controls by the controlling device 207.

The input device 202 is a device to input various data, and may include, for example, a keyboard, mouse, pointing device, touch panel, mouse pad, CCD camera, card reading device, paper tape reading device and magnetic tape device.

The primary memory device 203 is also called a "memory", and means all parts including addressable memory spaces that are used to execute commands in the processing device and internal memory device. The primary memory device 203 mainly consists of semiconductor memory elements. The primary memory device 203 stores and retains programs and data that have been input, and reads out the stored/retained data onto a register, for example, according to commands from the controlling device 207.

Also, the semiconductor memory elements composing the primary memory device 203 are formed from random access memories (RAMs), read only memories (ROMs), or the like.

The output device 204 outputs operation results of the operation device 208. Examples of the output device 204 include, for example, display devises such as a CRT, plasma display panel and liquid crystal display, printing devices such as a printer, and sound output devices.

The auxiliary memory device 205 is a memory device for supplementing the memory capacity of the primary memory device 203, and its examples include magnetic disk devices, optical disk devices and semiconductor disk devices, such as, for example, a floppy disk, hard disk, CD-ROM, CD-R, CD-RW, DVD-ROM, DVD-R, DVD+RW, DVD-RW, DVD-RAM, and MO.

The communication device 209 performs communication with outside networks and performs functions such as sending/receiving data compatible with the connected network and digital/analog data conversion.

The devices mentioned above are connected to one another via an address bus or a data bus.

It is noted that the number of the primary memory device 203 and auxiliary memory device 205 described above is not limited to one for each, but can be more than one. In general, the greater the number of the primary memory device 203 and the auxiliary memory device 205, the better the trouble-resistance of the controlling section 60 becomes.

Programs relating to flowcharts of the present invention to be discussed below and various programs for performing image forming processes shown in FIG. 1 are stored (recorded) in at least one of the primary memory device 203 and the auxiliary memory device 205 described above. Accordingly, the computer-readable recording media that stores programs related to the present invention corresponds to at least one of the primary memory device 203 and the auxiliary memory device 205 described above.

Also, in the description of the present invention and embodiments of the present invention, computer-readable storage media (i.e., recording media or memory media) include storage media which image forming apparatuses can read, storage media which servers can read, and storage media which clients can read.

The structure of the controlling section shown in FIG. 2 is applicable not only to the structure of the controlling section 60 which is shown in FIG. 1 and is used in color image forming apparatuses but also to the structure of controlling sections of other generally used information processing devices. Also, the structure of the controlling section shown in FIG. 2 is applicable to controlling sections of personal computers, etc., which users can operate.

Figure 3:
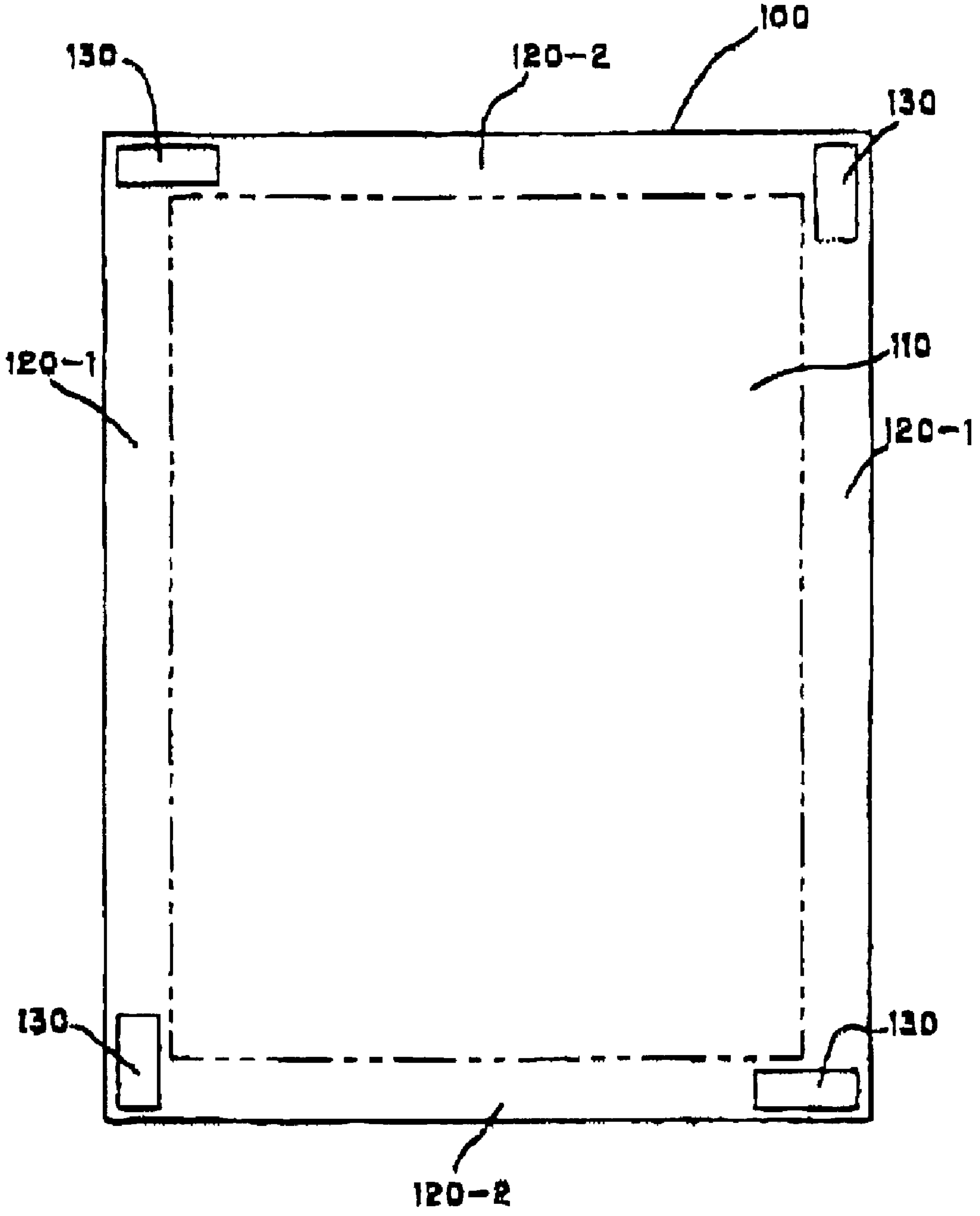
FIG. 3 schematically shows a recording material used in the color image forming apparatus shown in FIG. 1.

Next, the steps and mechanism for recognizing recording materials through placing advertisement onto the recording material will be described with reference to FIG. 3. FIG. 3 generally shows a recording material used for the color image forming apparatus shown in FIG. 1. Here, the recording materials used for the present invention are not limited to paper but can be, for example, OHP sheets. Also, the material quality of medium is not restricted.

First, recording materials are classified into two situations where 1) materials are purchased at a regular price; and 2) materials can be purchased at no cost (as advertisers have the right to place advertisements (including, for example, image information) on recording materials) or at a lower price. In the present invention, a "regular purchase price" is applied to recording materials whose prices have not been changed as recording materials that record the image information. Also, recording materials which record the image information are normally priced lower than regular purchase prices, but this invention is not limited to such cases.

There are various types in each recording material as indicated above. In one aspect, at least one detection section is provided on recording material which can be used to detect the type of the recording material.

In accordance with the embodiment of the present invention, recording material determination sections are provided on side sections of recording material. In the present invention, the side section of recording material in which the recording material determination section is formed means one section on at least one of the front surface and the rear surface of the recording material. The side sections may be provided along edges of the front surface and/or the rear surface of the recording material. In the present invention, a recording material determination section can be formed in sections other than the side sections of recording material. In addition, in the following discussions, recording materials in which advertisers can place advertisements are called advertisement-recording materials, and recording materials on which advertisers can not place advertisements are called non-advertisement-recording materials.

Recording material 100 contains regular printing area 110 and non-printing areas 120-1 and 120-2. The non-printing areas 120-1 are provided on both sides of the recording material 100, and the non-printing areas 120-2 are provided on the top and bottom (i.e., leading and trailing end sections) thereof. These areas are generally treated as margins, which prevent occurrences of printing errors in which images and letters are printed outside the recording material 100.

A recording material determination section 130, which is an element in accordance with an embodiment of the present invention, may be placed in each of the non-printing areas 120-1 and 120-2.

The recording material determination sections 130 may be placed in all of the corner sections of the non-printing areas 120-1 and 120-2. By placing the recording material determination sections 130 at all of the corner sections, it would be possible to determine if the recording material 100 is an advertisement-recording or non-advertisement-recording material even when the recording material 100 is set on the image forming apparatus in either direction. The present invention, however, is not limited to situations where the recording material determination sections 130 are placed in all of the corner sections of the recording material. The recording material determination section can be placed in at least one corner section of the recording material. For example, if the insert direction of recording materials into a paper tray (a device for storing media such as paper used for printing) is pre-set and always the same, at least a part of the object of the present invention will be achieved without placing recording material determination sections at all of the corner sections.

Figure 4:
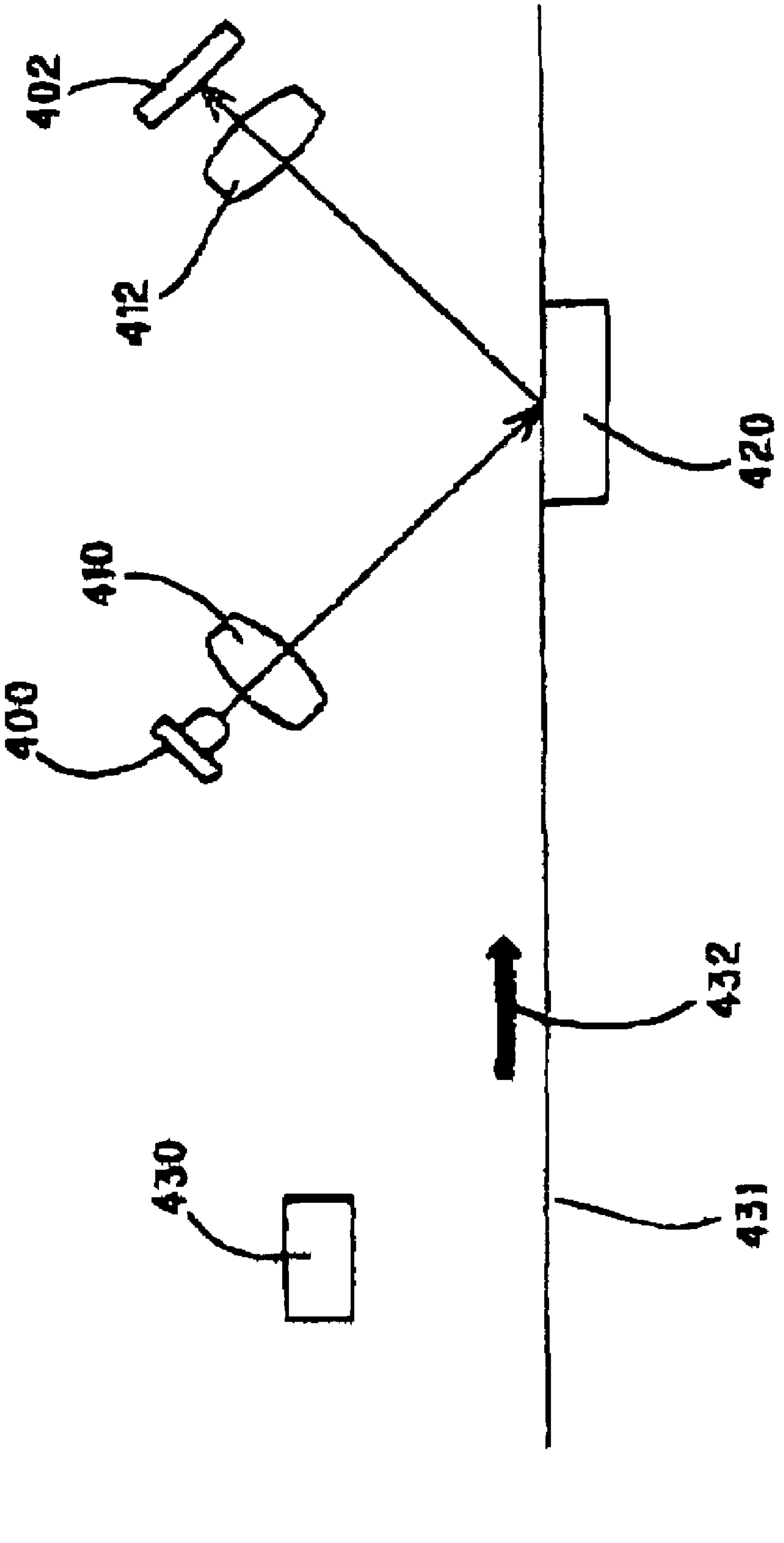
FIG. 4 schematically shows a recognition mechanism which recognizes recording material determination sections 130 used in the color image forming apparatus shown in FIG. 1.

First, in these non-printing areas 120-1 and 120-2, the recording material determination sections 130 are placed using at least one color different from the primary color of the recording materials. The color of the recording material 100 is often white, and the color other than white is used for the recording material determination section 130. Next, referring to FIG. 4, descriptions will be made as to a recognition mechanism which recognizes the recording material determination sections 130, and is used in the color image forming apparatus shown in FIG. 1. FIG. 4 schematically shows the recognition mechanism which recognizes the recording material determination section 130, and is used in the color image forming apparatuses shown in FIG. 1.

The recognition mechanism shown in FIG. 4 includes a light emitting sensor 400 such as an LED sensor for emitting LED light, a light receiving sensor 402 which receives electromagnetic waves such as LED light, a light projection lens 410, and a light receiving lens 412.

First, when image data etc. are transferred to the printer side and image outputs are ready, the recording material 100 such as recording paper is supplied from the paper supply cassette 41 or the paper tray 41. The recording material 100 is supplied in the direction indicated by an arrow 432 in the figure. When the recording material supplied enters a paper feeing path 431, a jamming detection sensor 430 detects that the recording material 100 is being supplied. Upon detection by the jamming detection sensor 430, the light emitting sensor 400 emits infrared light. The infrared light is converged by the light projection lens 410 and is reflected at a reflector 420. The infrared light reflected on reflective body 420 is converged by the light receiving lens 412 and projected to the light receiving sensor 402. The reception level of the light receiving sensor 402 at this time is at 1. When the next recording material 100, which has passed through the paper feed path, passes over the light path of the infrared light, the reception level of light receiving sensor 402 will change.

The reflection level of the recording material 100 is set at the same as or more than the reception level 1 when recording materials are white, and the reception level may be set below 1 when the light reflects on the recording material determination section 130. Determinations are made as to whether changes in the reception level are larger or smaller than the reflection level of reflective body 420.

In other words, as advertisement-recording materials contain the recording material determination sections 130, the reception level of the light receiving sensor 402 becomes less than 1 such that the advertisement-recording materials are detected as advertisement-recording materials. On the other hand, as non-advertisement-recording materials do not contain recording material determination sections 130, the reception level of the light receiving sensor 402 becomes 1 or more such that the non-advertisement-recording materials are detected as non-advertisement-recording materials.

The present invention, however, is not limited to detecting whether or not the reception level of the light receiving sensor 402 becomes smaller than "1". In other words, the material determination section 130 can be used with various reflectance (of electromagnetic waves or light).

Also, when performing a process to detect if the reception level is smaller (or larger) than a predetermined value, the predetermined value does not have to be "1" and can be changed accordingly based on the color tone or the like of paper medium. In this case, the light receiving sensor 402 not only detects if the reception level is smaller or larger than 1, but makes determinations of other reception levels, for example, 0.3, 0.5 and 0.7. Of course, the reception levels determined can be other values. Based on this determination result, the color image forming apparatus shown in FIG. 1 may obtain different image information necessary to form images on each of the recording material where the recording material determination sections 130 are formed, and may form the images in the recording material. The procedure to obtains image information will be described below in greater detail.

After detecting if the material is an advertisement-recording material or a non-advertisement-recording material by the recognition device, if the material is detected to be non-advertisement-recording, images, etc., will be transferred onto the non-advertisement-recording material according to the normal sequence.

On the other hand, if the material is detected to be advertisement-recording, predetermined advertisement information that was set up in advance is retrieved into a printer via a network such as the Internet.

Figure 5:
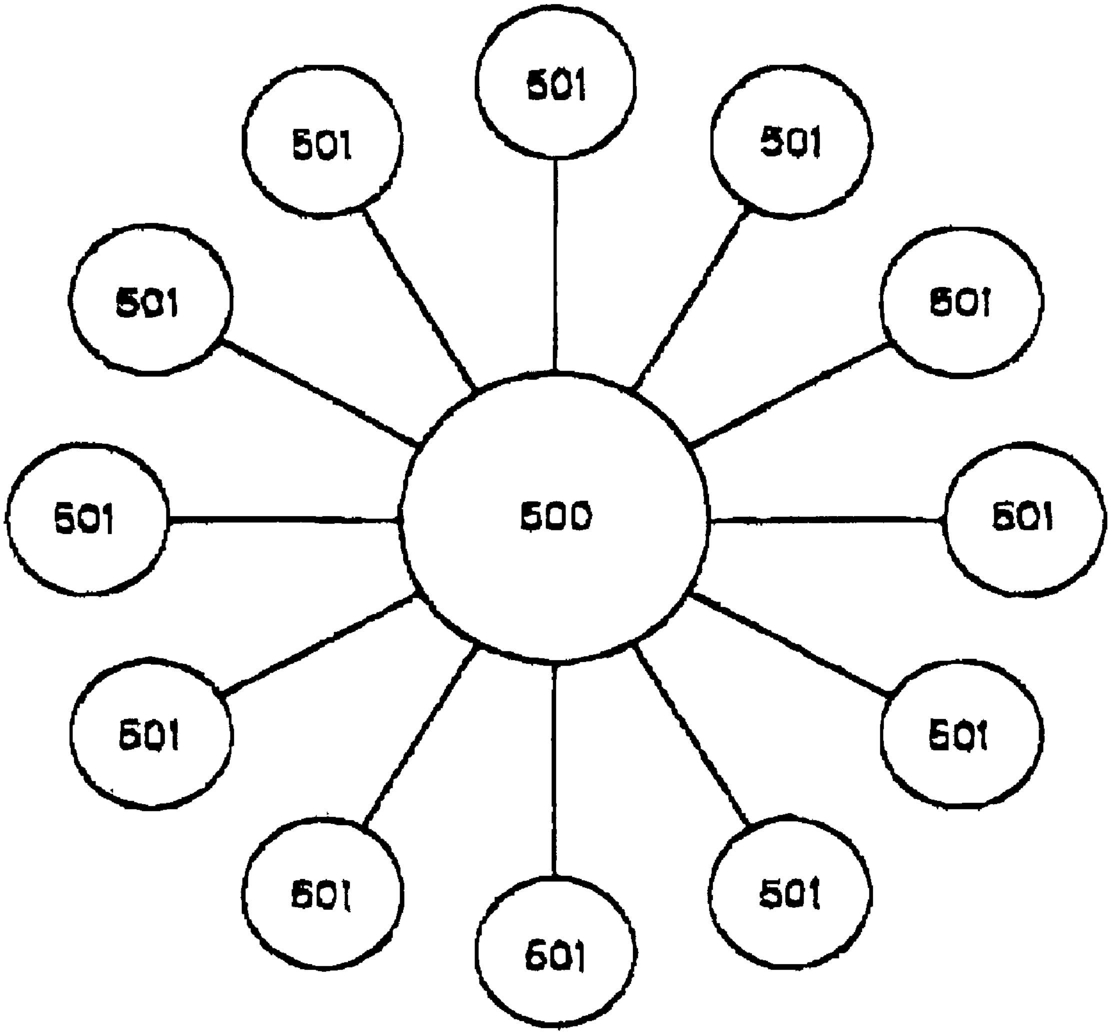
FIG. 5 schematically shows a network structure formed with multiple color image forming apparatuses shown in FIG. 1.

A network structure that can be built with image forming apparatuses will be described with reference to FIG. 5. FIG. 5 schematically shows the network structure that can be built with the color image forming apparatus shown in FIG. 1. As shown in FIG. 5, advertisement information is managed on an advertisement information management server 500 which is a component of this invention. A plurality of color image forming apparatuses 501 are connected to the advertisement information management server 500 via a network, and retrieve the advertisement information managed by the advertisement information management server 500, and transfers images to advertisement-recording material 101. Also, in this embodiment, an example wherein the Internet with TCP/IP is used as a network will be described. However, the network used in the present invention is not limited to the Internet, but other types of networks using or partially using other appropriate protocols such as WAP (wireless application protocol) can also be used. Also, the Internet mentioned above can use IPv4, IPv6 or both. Further, the network can also use cable transmission, wireless transmission or both.

Advertisement information is image-processed with information such as images which has previously been sent in the image forming apparatus, and is written in any of the non-printing areas 120-1 or 120-2 of the recording material 100 shown in FIG. 3.

In addition, this advertisement information can be written into the printing area 110. When, the advertisement information is written on the printing area 110, an image that is originally designed to be written in the printing area 110 can be automatically changed in height-width ratio and reduced in size, such that the advertisement information can be written in the printing area 110. Furthermore, if the height-width ratio is changed, locations into which the advertisement information is written are not restricted, and they can be located in the upper, lower, right or left portion of printing area 110.

Figure 6:
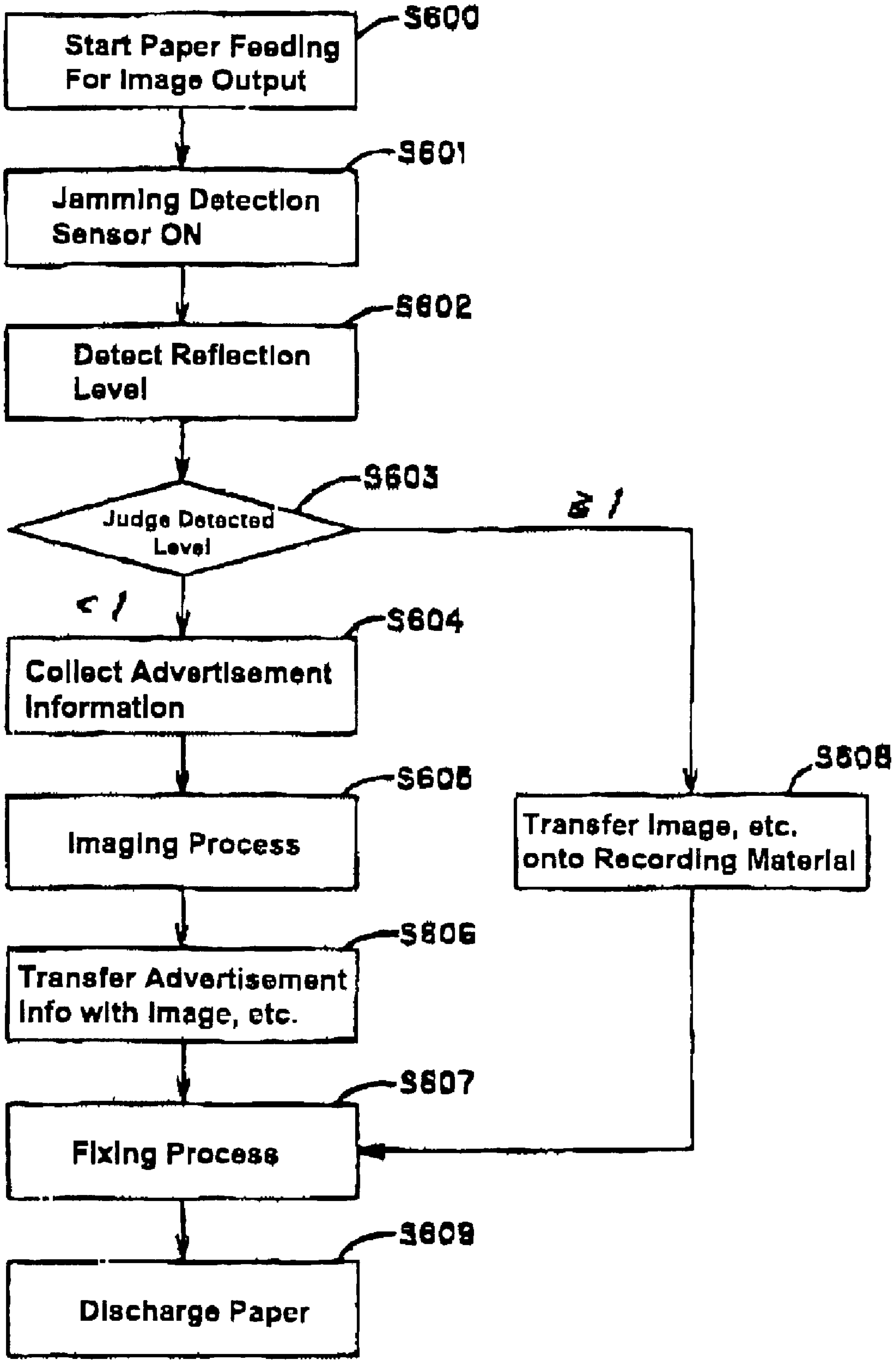
FIG. 6 is a flowchart of operations performed by the color image forming apparatus shown in FIG. 1.

FIG. 6 is a flowchart of operations performed by the color image forming apparatus shown in FIG. 1. Also, the flowchart shown in FIG. 6 is accomplished when the CPU201 shown in FIG. 2 reads and executes the programs stored in predetermined storage sections associated with this flowchart. In FIG. 6, when an image output operation commences at step S600, the recording material 100 will be fed from the paper supply cassette, or the like. The jamming detection sensor which detects the start of paper supply is turned ON at step S601, the recording material detection system, which detects the type of the recording material 100 being fed, is activated at step S602 and detects the reflection level of the recording material. The detection level is determined at step S603, and when a change in the reflection level from the initial level is less than 1 (less than a predetermined value), the recording material 100 is determined as advertisement-recording material 101. Also, the determination steps such as steps S602 and S603 can be done before the paper feeding step. In such a case, the recognition mechanism may be equipped with a function which can recognize the recording material determination section 130 before the paper feeding step starts. This will apply to the FIGS. 7 and 15 discussed later.

On the other hand, if the reflection level is 1 or more, a determination is made that the recording material 100 is not advertisement-recording material 101, and a normal printing of images, etc. is performed at step S608.

After detecting that the material is an advertisement-recording material 101, advertisement information is collected as images based on image information from the advertisement information server 500 via the Internet at step S604. In other words, image information, collected in either of the primary memory device 203 or the auxiliary memory 205 shown in FIG. 2, is recorded. In addition, we will further explain in detail the processes related to operations of the image information device when collecting advertisement information into the image forming apparatus via the Internet at step S604.

First, at step S603, if the recording material is determined as advertisement-recording based on the reflection level detected by the image forming apparatus, based on the URL (Uniform Resource Locator) previously stored in a memory section (corresponding to the main memory device 203 or the auxiliary memory device 205 shown in FIG. 2) of the image forming apparatus, the image forming apparatus attempts to access an external server.

Next, advertisement information previously stored in the memory areas of the server apparatus, which is specified according to the URL, is downloaded (sent) to the image forming apparatus based on predetermined communication protocols.

Also, if multiple reflection levels are set up such that the multiple levels are detected in step S603, and URLs corresponding to the multiple reflection levels are stored in the memory area of the image forming apparatus, different advertisement information corresponding to the various reflection levels can be collected in the memory area of the image forming apparatus, and printed on advertisement-recording materials.

For example, multiple reflection levels can be realized by coating or painting different recording materials at the recording material determination sections 130 described above with reference to FIG. 3, or by using recording materials in different colors to differentiate reflectance.

In addition, in the present invention, the URL or URLs to be recorded in advance in the memory section of the image forming apparatuses can be stored before the image forming apparatus is shipped from a factory, or can be collected through communicating with external electronic equipment (for example, information processing devices connected via cable or LAN, or servers which can be communicated with via the Internet) and exchanging data with such external electrical equipment, but there are no limitations.

Also, as another embodiment example, (although the URL is stored in advance in the memory area of the image forming apparatus in the explanation above) at step S603, information indicative of the detected reflective level may be notified by the communication device 209 to an external server which can be communicated via a specified communication line such as the Internet, advertisement information matching the refection level may be searched from the advertisement information stored in the memory section in the server, and the searched advertisement information may be sent to the image forming apparatus through the specified communication line. This provides some advantages. For example, by doing so, processes relating to pre-storing URLs using the memory section of the image forming apparatus used by the user do not have to be performed.

Additionally, in accordance with another embodiment, advertisement information the user might prefer may be stored in advance in the image forming apparatus using a communication device function of an information processing device connected to the image forming apparatus or the communication device 209 (Internet communication function) set up in the image forming apparatus, and the stored advertisement information may be retrieved into the image forming apparatus in step S604.

Furthermore, accesses to external servers via predetermined communication lines such as the Internet can be realized, for example, by activating the communication device 209 according to information (such as for example various characters) input through the input device 202 provided in the image forming apparatus.

Advertisement information is taken in the printer through the process at step S604 described above, the information is image-processed at step S605, and images and the advertisement information are transferred onto the advertisement-recording material 101 at step S606. After the images etc. are fixed in step S607, the advertisement-recording material 101 is discharged and the process is completed at step S609.

Upon confirming the first page of information, the image information is taken in according to the steps described above, and if multiple pages are to be outputted successively, while only a determination is made as to if the advertisement information can be written in the recording material, the advertisement information is successively transferred onto the recording material.

When a detection is made that recording material is not for writing the advertisement information while writing successively, the advertisement information is not written, and a verification is made first as to the condition of the next recording material. If the advertisement information can be written in the next recording material, then the advertisement information is written on the next recording material, and if not, the process does not write the advertisement information, and verifies the condition of the next recording material. The steps described above are repeated, such that the advertisement information are printed consecutively on multiple pages.

Also, when transferring consecutively on recording materials, if there are recording materials to be printed with different advertisement information that are determined by different recording material determination sections 130 with different reflectances described above, the image forming apparatus of the present embodiment will read these different advertisement information, and then it will take in the different advertisement information and transfer the advertisement information.

If there are recording materials containing different advertisement information, it will take more time to communicate advertisement information and therefore the transfer speed of the image forming apparatus will slow down. However, the time required for the printing process including collection of advertisement information can be shorten by collecting and storing image information for the advertisement information that were previously used into the memory areas of image forming apparatuses.

Also, a part of the flowchart shown in FIG. 6 above can be achieved by an information processing apparatus (PC) connected to the image forming apparatus. For example, at step S602, the reflection level detection information may be notified by the color image forming apparatus to the information processing device; at step S603, a determination is made by the information processing device; at step S604, image information is collected from the information processing device, or advertisement information stored in the information processing device is notified to the color image forming apparatus, and advertisement information stored in the information processing device can be downloaded in advance via the Internet, etc.

(Operations to Determine the Presence of New Advertisement)

The image forming apparatus may be provided with a detection device having a function to regularly confirm if the collected images are updated. The detection device for checking if the collected images in the image forming apparatus has been updated may be implemented as follows.

First, external servers which contain advertisement information are set up so that advertisers can renew their advertisements regularly or when they want to. In effect, new advertisement information is generally sent from the information processing apparatus that the advertiser uses to the external server and then is registered at the external server. The renewed advertisement is registered (stored) in the external server, and the external server can maintain old advertisements and new advertisements with their control numbers.

As such, the image forming apparatus can obtain advertisements managed at the external server via a predetermined communication line (e.g., the Internet) regularly or any time when necessary.

The image forming apparatus is equipped with a detection device having functions to detect if the most recent advertisement information is obtained within a predetermined time frame mentioned above or if advertisement information are read through the communication line at predetermined time. The detection device may confirm that the most recent advertisement information is obtained if the control number of the obtained advertisement has been renewed since last time advertisement information was obtained.

However, for some reason, there may be occasions where advertisement information may not have been read within the predetermined time frame. This may happen, for instance, when the main power supply of the image forming apparatus is turned off. In this case, after the power supply at the image forming apparatus is turned on, the detection device may detects if the image forming apparatus attempted to read the most recent advertisement information. When it is detected that the advertisement information was not read, the detection apparatus attempts to connect to the external server described above and obtain the most recent images.

By performing such confirmation steps, the image forming apparatus can maintain multiple images and can reduce the output time to transfer images onto recording materials.

Figure 7:
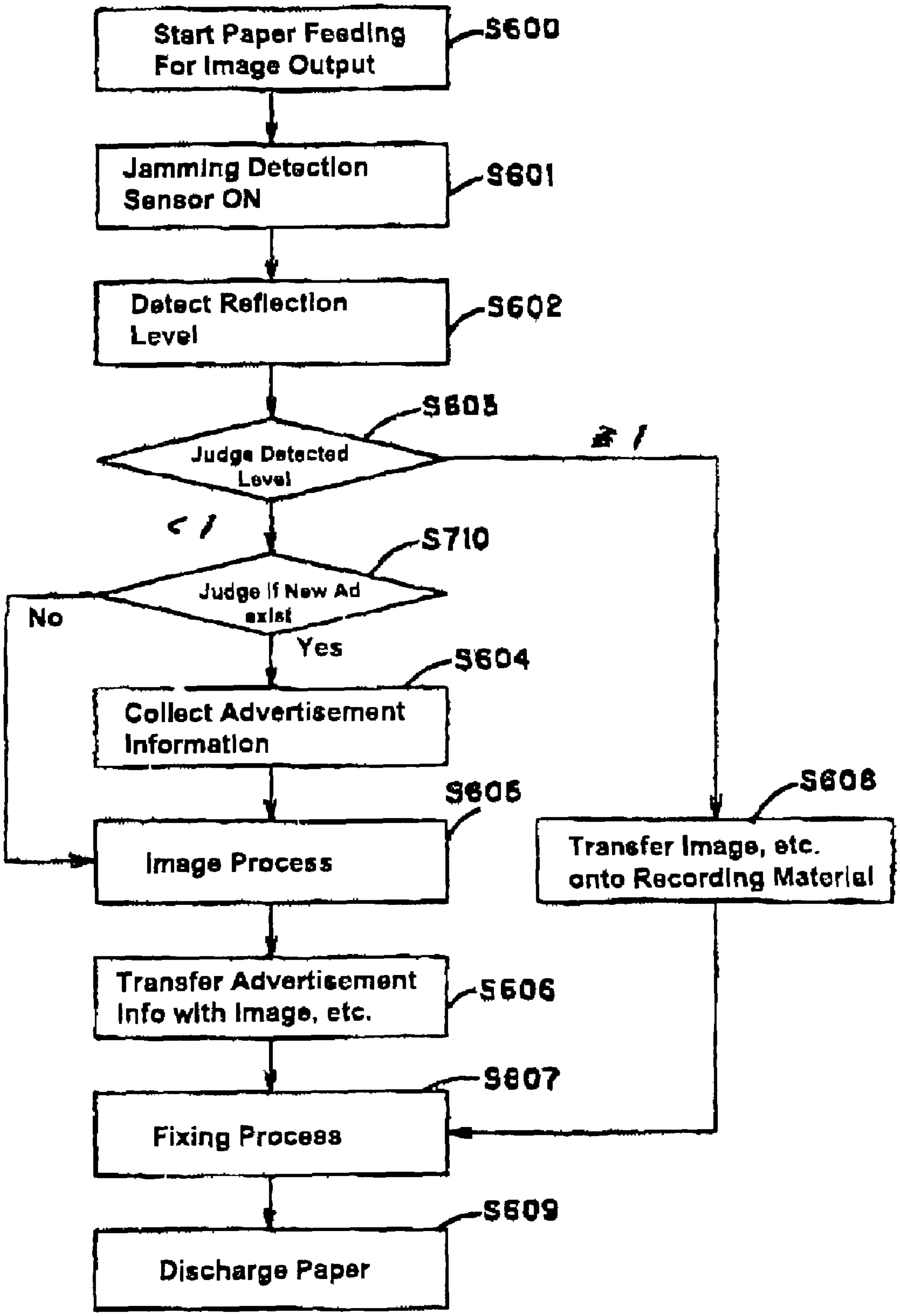
FIG. 7 is a flowchart of operations performed by the color image forming apparatus shown in FIG. 1.

Operations to determine the presence of new advertisements will be described with reference to FIG. 7. FIG. 7 shows a flowchart to explain the operations performed by the color image forming apparatus shown in FIG. 1 just as the flowchart in FIG. 6 does.

FIG. 7 shows the flow of steps from imaging to paper discharging performed by the color image forming apparatus shown in FIG. 1. What is different from FIG. 6 is a new advertisements judging operation at step S710. Other steps in FIG. 7 indicated by the same reference numbers indicated in FIG. 6 perform the same operations as those described in FIG. 6. Also, the flowchart shown in FIG. 7 is achieved when the CPU 201 shown in FIG. 2 reads stored programs associated with this flowchart from predetermined memory areas. In the operations shown in FIG. 7, the image forming apparatus determines the detection level at step S603. Then, if it is determined that the recording material 100 is an advertisement-recording material 101, and then a detection is made as to whether or not new advertisement information has been read. If affirmative, the image forming apparatus performs an image processing (S605), and if negative, performs a collection of advertisement information (S604). Then the most recent advertisement information is read into the image forming apparatus and an image processing is performed (step S710).

In addition, a part of the flowchart shown in FIG. 7 above can be achieved by an information processing device (PC) connected to the image forming apparatus.

For instance, at step S602, a notification of the reflection level detection information is made by the color image forming apparatus to the information processing device; at step S603, a determination step is conducted by the information processing device; and at step S604, image information is obtained from the information processing device, or advertisement information stored in the information processing device is notified into the color image forming apparatus. Advertisement information stored in the information processing device can be downloaded in advance via a network such as the Internet.

Furthermore, at step S710, a step for searching advertisement information stored in the memory section of the information processing device may be conducted, or a step for determining advertisement information stored in the memory section of the information processing apparatus may be conducted by obtaining the status or the like via the communication line.

In this manner, the most recent advertisement information is regularly read and collected, and such information can be stored in the printer apparatus in advance. By this operation, the process time is reduced as the image forming apparatus does not have to collect the most recent information from the Internet every time it prints.

Accordingly, if there is no new advertisement information, the image forming apparatus performs the image processing at step S605. In addition, if one wants to obtain new advertisement information instantaneously, the external server may notify the image forming apparatus, which is connected to the external server via the Internet, that there is new advertisement information. If the external serve notifies the presence of new advertisement information, the image forming apparatus reads the new advertisement information and obtains it into the image forming apparatus.

The succeeding operations are the same as those in the flowchart discussed above and the advertisement-recording material 101 will be discharged.

(Successive Output Operations)

Next, successive output operations of the apparatus will be described. When outputs are to be continued after writing of the first page of advertisement information is completed, information is not collected via the Internet, and the image forming apparatus is set up to perform processes in a manner similar to those for the first page and to place similar advertisement information.

Of course, even in the case of successive outputs, advertisement information can be read and collected for each page and information that is different from information on the first page may be placed on each new page, which would, however, reduce the speed to output recording materials 100. Therefore, reading and collection of advertisement information are not normally conducted for each and every page.

Figure 8:
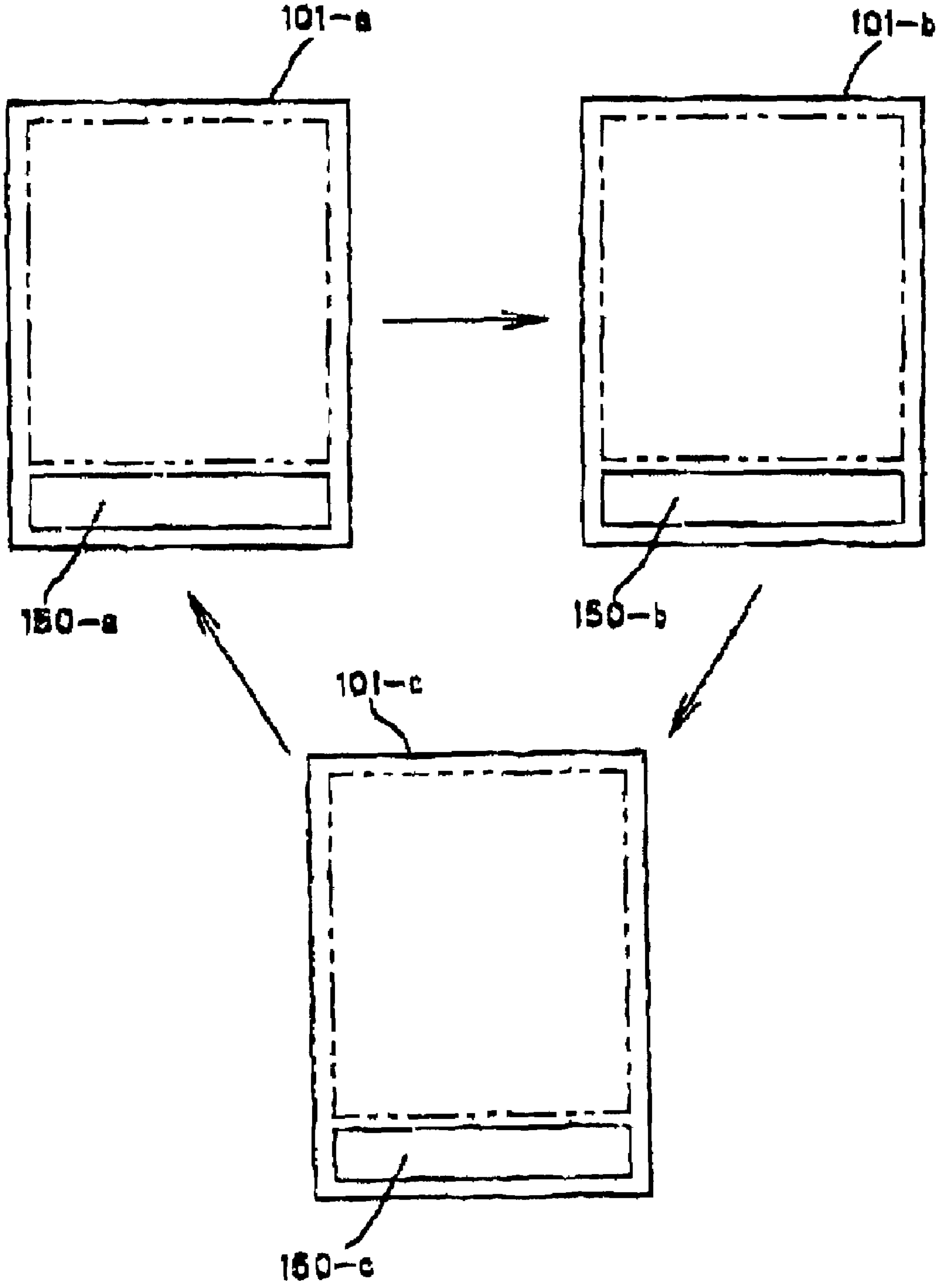
FIG. 8 schematically illustrates operations performed when the color image forming apparatus shown in FIG. 1 forms advertising images, which are provided by multiple advertisers, on a recording material.

On the other hand, when there are multiple advertisers for advertisement-recording materials, advertisements are alternately placed as shown in FIG. 8. FIG. 8 schematically shows operations performed when the color image forming apparatus shown in FIG. 1 forms advertisement images provided by multiple advertisers on recording materials.

This example shows a situation where recording materials are sponsored by three companies. Of course, the number of advertisers is not limited to three and can be any number (1 or more).

The first advertisement information 150-*a* as an image that is formed based on image information obtained from the advertisement information control server 500 is placed on the first page of an advertisement-recording material 101-*a*, the second advertisement information 150-*b* as an image based on image information obtained from the advertisement information control server 500 is placed on the second page of advertisement-recording material 101-*b*, and the third advertisement information 150-*c* as an image based on image information obtained from the advertisement information control server 500 is placed on the third page of advertisement-recording material 101-*c*. For the fourth page and thereafter, advertisement information as images that are formed based on image information successively obtained in a similar manner can be placed. The present invention, however, is not limited to situations where images to be formed on recording materials are changed for each page of image-forming even with multiple advertisers as described above. In other words, advertisement information may be recorded on multiple pages of recording materials for each advertiser. For example, advertisement information for the same advertiser may be recorded on two or three pages in a row, and then the advertisement information may be changed to another advertiser's advertisement information.

Even when outputs are not provided consecutively, advertisement information is placed in the order noted above. Also, whether or not materials are advertisement-recording materials is detected each time the recording materials passes through the jamming detection sensor 430, and therefore, when an advertisement-recording material is detected, advertisement information is always placed on the advertisement-recording material.

In principle, there are no particular requirements in the size of recording materials used as advertisement-recording materials, however, the size is determined by the supply capacity of each printer which performs the image processing.

White may be used for the original color of recording materials used for advertisement-recording materials. There is no problem in using other colors as long as advertisement recording materials can be discriminated by the recording material determination section 130.

Advertisement fees will be discussed below. Advertisement fees are, first, for the cost of recording materials. More specifically, there are generally two cases: 1) when advertisers are responsible for the entire cost of recording materials and provide users with the materials for no cost; and 2) when advertisers partially pay for the cost of materials and ask users to purchase the materials at a certain price.

When uses pay for the materials, they can purchase them at a lower price than a normal purchase price. Also, for advertisement information stored in the advertisement information management server 500, 1) new subscription fees, 2) maintenance fees for the advertisement information, and 3) renewal fees when an advertisement is renewed, can be collected from advertisers.

Figure 9:
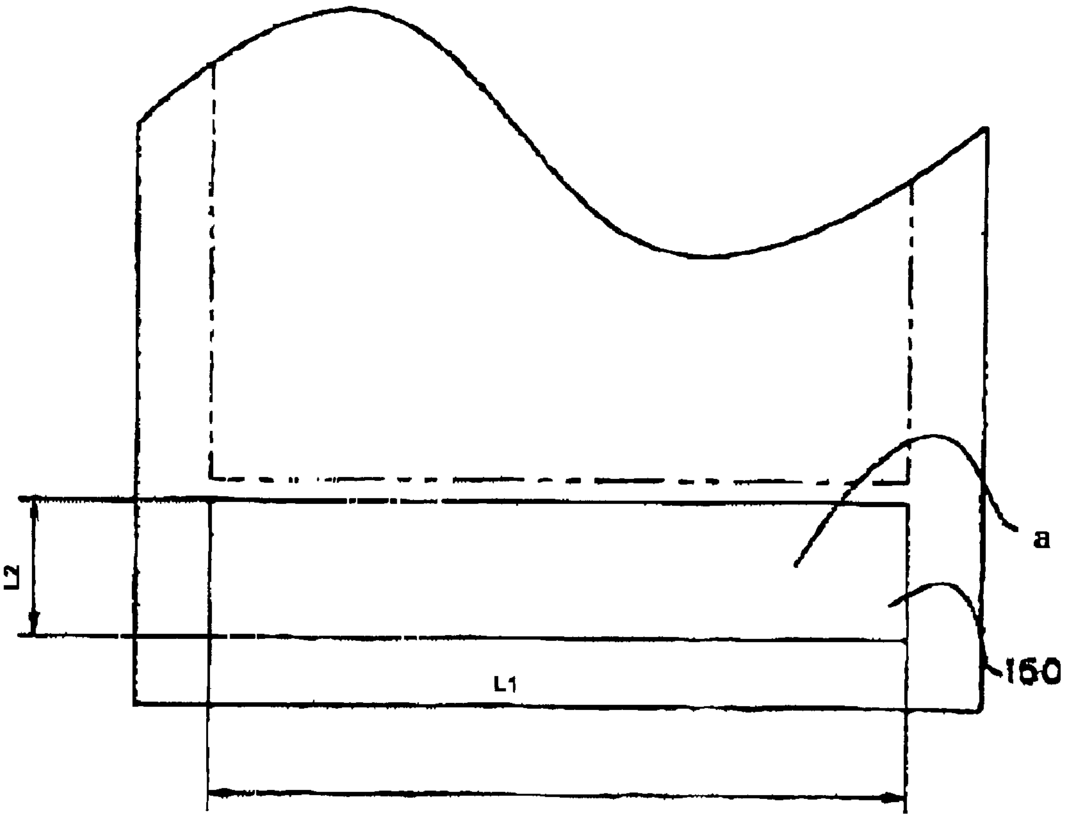
FIG. 9 is a conceptual summary drawing to explain the conditions to place advertisement information which are applied to the color image forming apparatus shown in FIG. 1.

Next, conditions to place advertisement information applicable to the color image forming apparatus shown in FIG. 1 will be described with reference to FIG. 9. FIG. 9 conceptually illustrates conditions to place advertisement information applicable to the color image forming apparatus shown in FIG. 1. Information used for advertisement is restricted as follows. FIG. 9 shows advertisement information 150 which is formed on advertisement-recording material 101 and is an image formed based on image information obtained from the advertisement information management server 500. The size of area where advertisement information is placed is defined by the width L1 and height L2.

The area defined by the width L1 and height L2 is assumed here as "1." When an area where images such as advertisement information 150 are placed, in other words, an area where toner used to transfer the images is placed is "a", a value $S=(a/1)\times100$ is defined here as an advertisement information area. Advertisement information is controlled so that the value S will not exceed a predetermined value.

In other words, when a request to obtain advertisement image information is issued from an external device (for example, the color image forming apparatus in FIG. 1), the server controls not to deliver advertisement image information to the external device if the value S for the advertisement image information exceeds a predetermined value.

The conditions may be further generalized as follows. When an area where advertisement image information is formed is "s1," and an area that carries toner used for transferring images is "a," a condition $S=a/(s1)$ is given. When the value S is over a predetermined value, advertisement image information will not be placed.

The width L1 and the height L2 which define the advertisement information area rate S can be any value.

For example, the advertisement information management server 500 is equipped with a condition determination device composed of a CPU or the like to judge if images that are formed by image information meet predetermined conditions, and the storage of images is controlled based on images information according to judgment results provided by the condition determination device.

Figure 10:
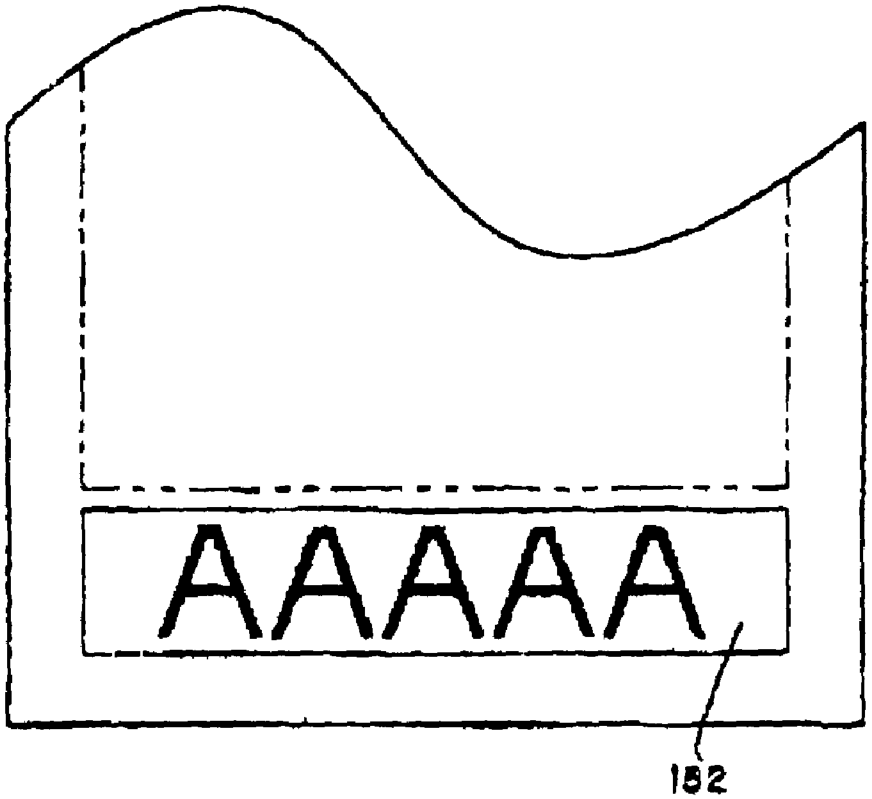
FIGS. 10(*a*) and (*b*) schematically show examples of the conditions to place advertisement information.
Figure 10:
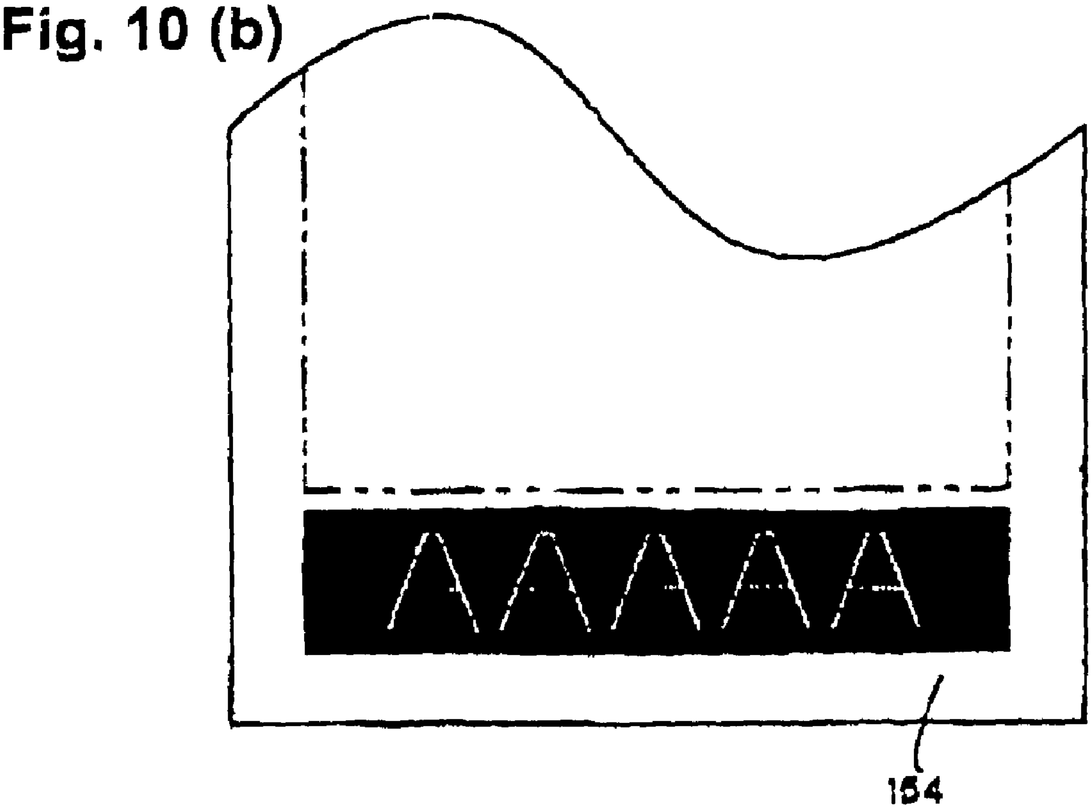

FIGS. 10(*a*) and (*b*) schematically show examples of conditions to place advertisement indicated in FIG. 9. First, in FIG. 10(*a*), the rate of advertisement information area S of advertisement information 152 is approximately 20%, which poses no problem, and this advertisement information 152 is registered in the advertisement information management server 500.

On the other hand, the rate of advertisement information area S for advertisement information 154 shown in FIG. 10(*b*) is approximately 80%. Because this advertisement information 154 is created by negative-positive reserving the advertisement information 152, and thus has a greater area that carries toner, a transfer range for the toner is approximately 80%.

The advertisement information 154 uses much toner and is not registered in the advertisement information management server 500. As noted above, when the advertisement information 150 is placed on the advertisement-recording material 101, a measure is taken so as not to increase the burden of users, for example, by refusing to place advertisements which consume toner (one of the office supplies) more than necessary.

Figure 11:
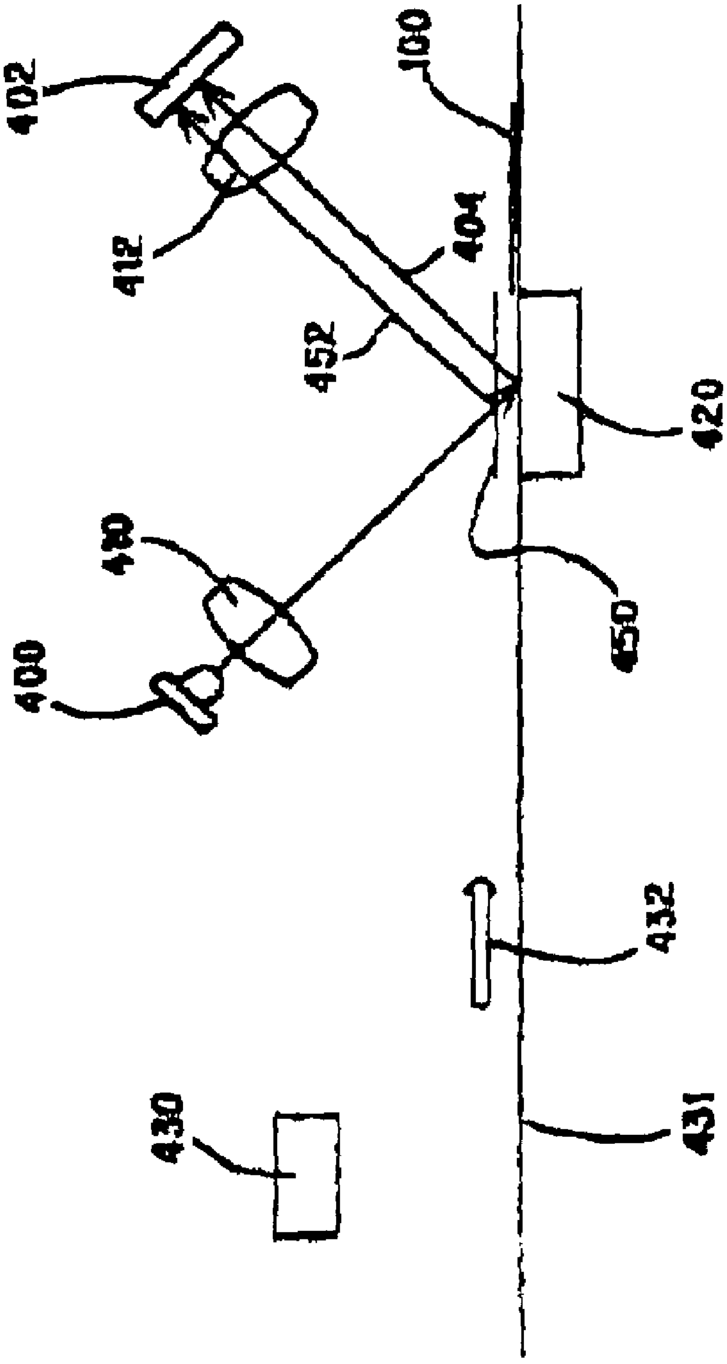
FIG. 11 schematically illustrates a processing method to be employed when the user ignores advertisement information and attempts to output with the color image forming apparatus shown in FIG. 1.

Next, referring to FIG. 11, a description is made as to a processing method employed when the user attempts to print while trying to ignore advertisement information. FIG. 11 schematically illustrates the processing method when the user attempts to output with the color image forming apparatus shown in FIG. 1 while trying to ignore advertisement information.

As discussed above, when an image writing process is communicated to the image forming apparatus, recording materials are supplied from the paper supply cassette 41.

Each of the supplied recording materials passes through the determination section formed from the light emitting sensor 400 and the light receiving sensor 402 which makes determinations on the supplied recording materials, which is disposed immediately after the jamming detection sensor 430.

Since the determination is made on the recording materials and an image processing for transferring advertisement information into images is conducted immediately after they are fed into the image forming apparatus, the advertisement information cannot be ignored.

Next, let us assume that, for example, the level difference between the light emitting sensor 400 and the light receiving sensor 402 which make determinations on recording materials is set outside the predetermined value. This situation will be discussed with reference to FIG. 11.

The basic functions of the components shown in FIG. 11 are similar to those of the components shown in FIG. 4. In other words, changes in the reflection ratio of a recording material which covers the reflective body 420 are detected when the light from the light emitting sensor 400 which emits infrared light hits and reflects on the reflective body 420 and enters the light receiving sensor 402.

On the other hand, as shown in FIG. 11, when a reflective body 450 having a relatively high reflectance is placed above the reflective body 420, the recording material 100 passes between the reflective body 450 and the reflective body 420. As a result, a determination cannot be made whether the recording material 100 detected is an advertisement-recording material 101.

In this case, since the light reflected on the reflective body 450 and entered the light receiving sensor 402 would show a reflection level above the predetermined level, all recording materials 100 would not be determined as advertisement-recording material 101 regardless of the type of recording material 100.

To cope with this type of situations, the light receiving sensor 402 can not only determine the light amount but the position of the incident light. More specifically, the light reflected from the recording material 100 or the reflective body 420 travels along a light path 404 and enters the light receiving sensor 402. On the other hand, the light reflected on the reflective body 450, which is placed above the reflective body 420, travels along a different light path 452 and enters the light receiving sensor 402 at a different point of light incidence. Using the difference in the light incidence, a determination can be made that the light is not reflected on the normal reflective body 420, then the printer may perform self-analysis to determine as to if the light path is manipulated on purpose or some foreign matter enters in the light path, and can either stop an image transfer process or communicate with a maintenance management department using a communication line such as the Internet.

Also, the location of the reflective body 405 having a relatively high reflectance is set primarily to secure a sufficient paper supply path for the recording material 100. As such, light paths of the light reflected on the reflective body 420 and the high reflective body 450 are clearly different, and the light receiving sensor 402 can determine if the light is being reflected as usual.

As described above, with the image forming apparatus in accordance with the first embodiment of the present invention, the recording material determination sections 130 are provided in recording materials on which advertisement information are formed.

The recording material determination sections 130 are detected by the light detection device mainly composed of the light emitting sensor 400 and the light receiving sensor 402. When the recording material determination sections 130 are detected, the image forming apparatus will obtain image information from the advertisement information management server 500. Then, the image forming apparatus forms images based on the image information obtained.

The images formed based on the image information are mainly advertisement. As such, providers of image information can place their advertisement on recording materials. In addition, users of image forming apparatuses can purchase recording materials for no or lower cost than usual by placing advertisement on recording materials.

(Second Embodiment)

Figure 12:
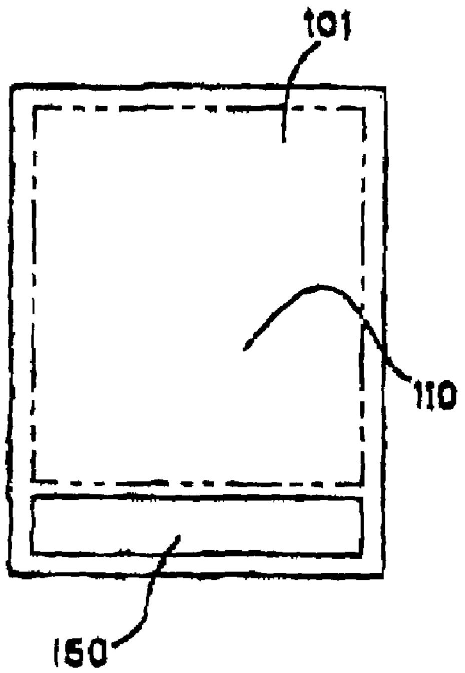
FIGS. 12(*a*), (*b*) and (*c*) schematically show recording materials used in an image forming apparatus in accordance with a second embodiment the present invention.
Figure 12:
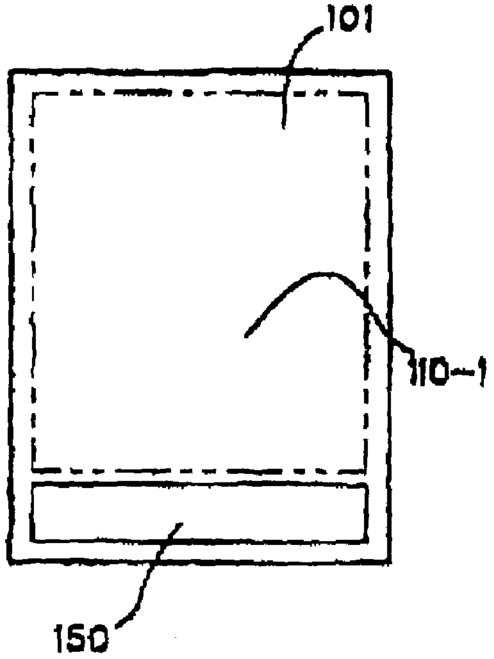
Figure 12:
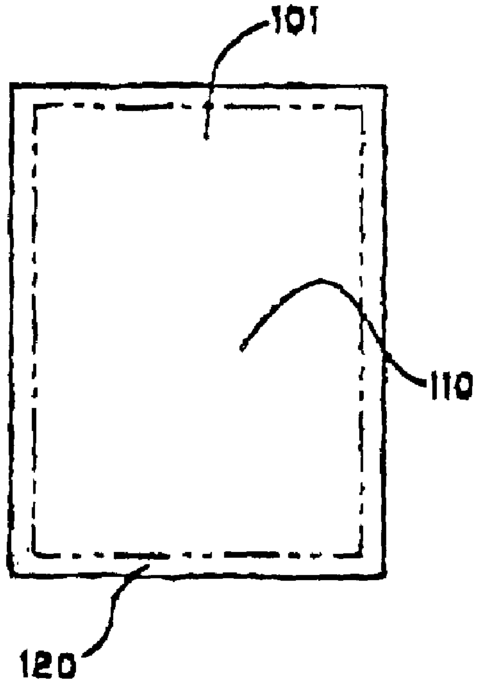

Next, referring to FIGS. 12(*a*), (*b*) and (*c*), an image forming apparatuses in accordance with a second embodiment of the present invention. FIGS. 12(*a*), (*b*) and (*c*) roughly illustrate recording materials used in the image forming apparatus in accordance with the second embodiment of the present invention. Components in FIGS. 12(*a*), (*b*) and (*c*) that are the same as those shown in FIGS. 1 through 11 will be indicated with the same reference numbers for the components used in FIGS. 1 through 11. In addition, explanations for similar components will not be repeated. In other words, the image forming apparatus of the second embodiment of the present invention is similar in its construction and component materials the image forming apparatus of the first embodiment discussed earlier unless noted otherwise.

In FIG. 12, the second embodiment is different from the first embodiment in that, when placing advertisement information on advertisement-recording materials, relations between the size of the advertisement information and the price of the advertisement-recording materials are different.

First, advertisement-recording materials can be provided in two ways: 1) advertisers bear the entire cost of recording materials and provide users with advertisement-recording materials at no cost; and 2) advertisers will bear part of the cost of recording materials, and provide advertisement-recording materials at some cost which is, however, lower than that in usual purchases.

First, it is necessary to determine if the cost of advertisement-recording materials is all or partially paid by advertisers. As explained in the first embodiment, the light receiving sensor 402 shown in FIG. 4 may be used to determine if the cost of advertisement-recording materials is all or partially paid by advertisers by detecting, for example, differences in the reflection percentages of recording material determination sections 130 which are formed in recording materials by an appropriate method such as printing.

When advertisement-recording materials are acquired at no cost, advertisement information becomes larger, and when they are acquired at some cost, advertisement information may become smaller. In other words, the image forming apparatus controls the printing so that the size of advertisement varies based on the amount paid by advertisers. In this case, the recording material determination section 130 may contain information indicating the size of advertisement.

Relations between the price of advertisement information materials and advertisement information are illustrated in FIG. 12 as follows.

First, when advertisers bear the entire cost of advertisement-recording material 101, advertisement information, which is an image based on the image information obtained from the advertisement information management server 500, is written anywhere in a printing area 110 of advertisement-recording material 101, such as, for example, in a bottom area 150.

Data that the user wants to output such as images and sentences are reduced in size to fit to a reduced printing area 110-1 which is created by changing the height-width ratio of the printing area 110 as shown in FIG. 12(*b*) and written in the reduced printing area, and the advertisement information is placed in the lower area 150 of the advertisement-recording material 101. This advertisement information area 150, however, is not limited to the lower part of the advertisement-recording material 101 but can be located in other locations.

Next, when advertisers bear part of the cost of the advertisement-recording material 101 as shown in FIG. 12(*c*), advertisement information is written outside the printing area 110.

Data that the user wants to output such as images and sentences are written in the printing area 110 as usual as shown in FIG. 12(*c*), and advertisement information is written in a non-printing area 120.

Also, advertisement information which is placed on advertisement-recording material 101 may be set to a fixed range regardless of the price of recording materials paid by advertisers.

For example, even when advertisers bear the entire cost of advertisement-recording material 101 and its advertisement to be placed on the advertisement-recording material 101 fits in the non-printing area 120 as shown in FIG. 12(*c*), the advertisement can be placed within a fixed area regardless of the purchase price of advertisement-recording material 101.

As described above, in the present embodiment, the determination device mainly composed of the light emitting sensor 400 and light receiving sensor 402 shown in FIG. 4 may detect if advertisers bear all or part of the cost of advertisement-recording material 101. If advertisers bear a substantial cost, the size of advertisement information 150 placed in the advertisement-recording material 101 may be made larger, and if advertisers bear a small cost, the size of advertisement information 150 may be made smaller. Accordingly, users can selectively use the advertisement-recording materials 101 for different purposes.

(Third Embodiment)

Figure 13:
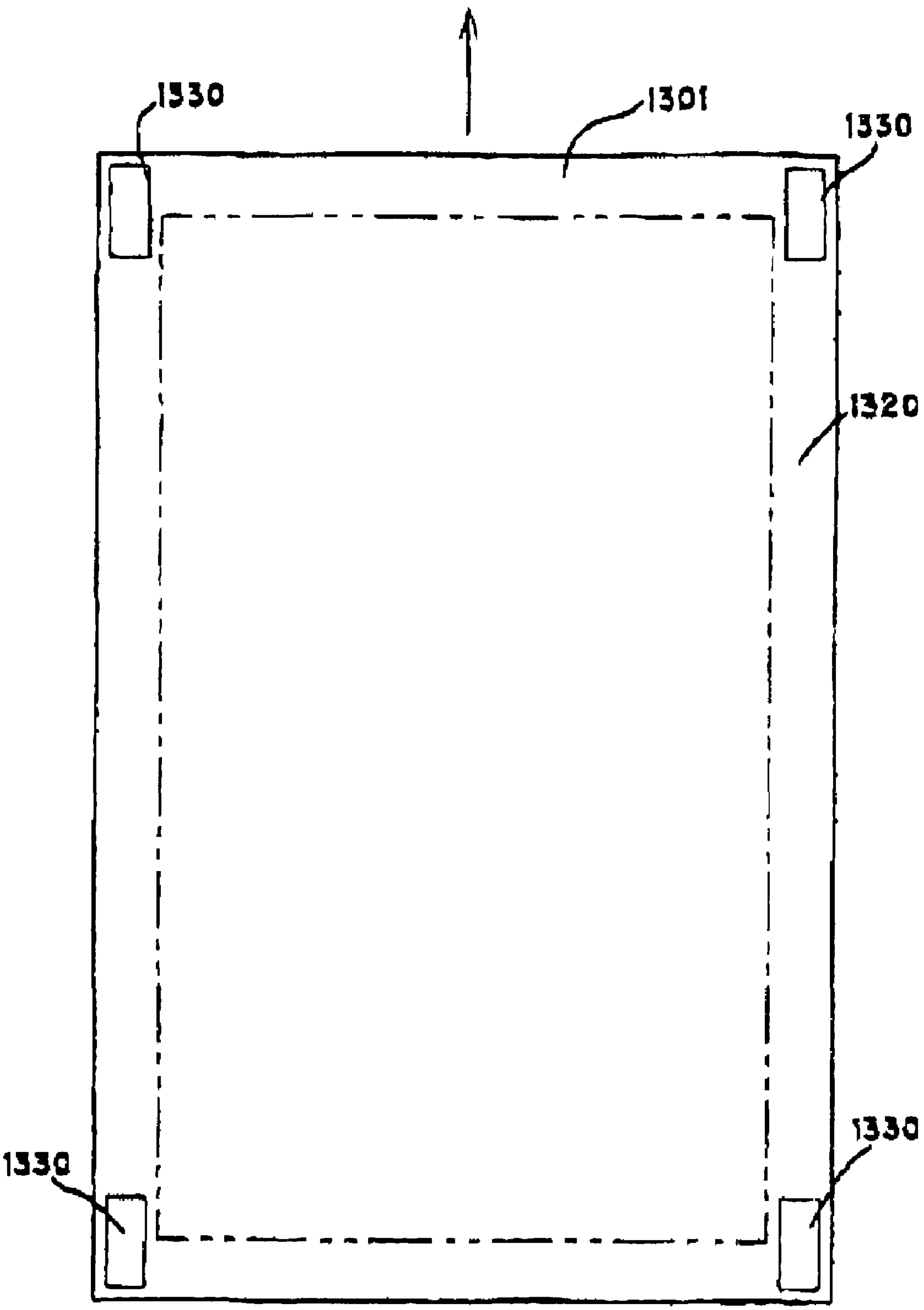
FIG. 13 schematically shows a recording material used in an image forming apparatus in accordance with a third embodiment the present invention.

Next, referring to FIG. 13, an image forming apparatus in accordance with a third embodiment of the present invention. FIG. 13 roughly illustrates a recording material used in the image forming apparatuses of the third embodiment of the present invention. The image forming apparatuses this embodiment is similar in its construction and its components to those of the first embodiment unless otherwise noted. This embodiment provides a system that enables detections as to whether recording materials are advertisement-recording materials, as well as which advertiser placed advertisement information in the advertisement-recording materials, and can place advertisement information accordingly.

FIG. 13 shows a typical example of an advertisement-recording material. An advertisement-recording material 1301 has recording material determination sections 1330 in non-printing areas 1320. The recording material determination sections 1330 are used to determine if the advertisement-recording material 1301 is an advertisement-recording material as well as which advertiser placed each advertisement.

The advertisement-recording material 1301 is fed in a paper feed direction indicated by an arrow in the figure. In at least one of the recording material determination sections 1330, and preferably in all of them, bar-codes are formed perpendicular to the paper feed direction. A bar-code reading device (i.e., a recognition device) which may be formed, for example, from the light emitting sensor 400 and the light receiving sensor 402 is provided to detect these bar-codes formed in the recording material determination sections 1330 of the advertisement-recording material 1301.

For instance, when the bar-code reading device reads bar-codes of the recording material determination section and detects that Company A paid for the entire cost of recording materials, the image forming apparatus reads Company A's advertisement via the Internet, or transfers Company A's advertisement information, that has been collected in advance via the Internet and stored in the memory device of the image forming apparatus, onto an advertisement information placement section of the advertisement-recording material.

For downloading advertisement information from an external server (which, for example, corresponds to the advertisement information management server 500 in FIG. 5) via the Internet, the bar-codes recorded in the recording material determination section may contain information which specifies advertisement information provided by advertising companies, such as information indicating URLs. In addition, the bar-codes may contain information that specifies how much of the cost related to recording materials advertisers will bear.

In this case, for example, advertisement-recording materials 1301 for the number of sheets (i.e., 1,000 sheets of recording paper) for one unit may be provided to users by Company A with its entire cost paid by Company A.

However, different advertisement-recording materials 1301 may be mixed in a paper supply cassette of the printer apparatus, or recording materials may be supplied through a paper supply path from different paper supply cassettes. Accordingly, it may be necessary to detect which advertiser owns the advertisement-recording materials 1301 every time advertisement information is to be printed.

Referring to FIG. 13, a description will be made as to a method to control a situation where multiple advertisement information of Company A are prepared and the advertisement information to be placed are changed based on multiple information provided in advertisement-recording materials.

Recording material determination sections 1330 in advertisement-recording materials 1301 provided by Company A contain multiple advertisement information of Company A itself.

For example, upon reading the recording material determination section 1330 in the advertisement-recording material 1301 on the first page, the recording material determination section 1330 may give a command to write the first advertisement information. Next, upon reading the recording material determination section 1330 in the advertisement-recording material 1301 on page "n", it may give a command to write the n-th advertisement information. Each of the advertisement information may be downloaded through the Internet before the transfer of the preceding one onto the advertisement-recording materials is completed, and the downloaded advertisement information is image-processed and transferred onto the advertisement-recording materials. In this manner, advertisement information which is specified by the advertiser can be placed on each (or each set) of advertisement-recording material, and thus more meaningful placement of advertisement information can be achieved.

In this manner, a function can be added to the recording material determination section 1330 in the advertisement-recording material 1301 to determine which advertiser provides the recording material. By this function, images based on predetermined image information provided by predetermined advertisers can be specified as advertisement images to be formed on recording materials. Accordingly, more effective advertisement information can be placed in the advertisement-recording materials, and therefore more effective advertisement information of advertisers can be presented to users in a more attractive manner.

In the example described above, bar-codes are read and detected as a method to recognize advertisers in advertisement-recording materials, however, other types of recognition methods can also be used.

Furthermore, when a bar-code reading device is installed in the image forming apparatus, the flow chart shown in FIG. 6 or FIG. 7 may be modified in the following manner. For example, the step of reading bar-codes may be conducted in step S601 and/or S602 in FIG. 6 or FIG. 7. Step S603 may succeed only to step S604, and the content of the bar-codes is analyzed at step S603, and advertisement information corresponding to the analyzed result obtained in step S603 may be collected or read in step S604. In this manner, the image forming apparatus achieves a process of printing advertisement information on advertisement-recording materials where bar-codes are recorded on the recording materials.

(Forth Embodiment)

Figure 14:
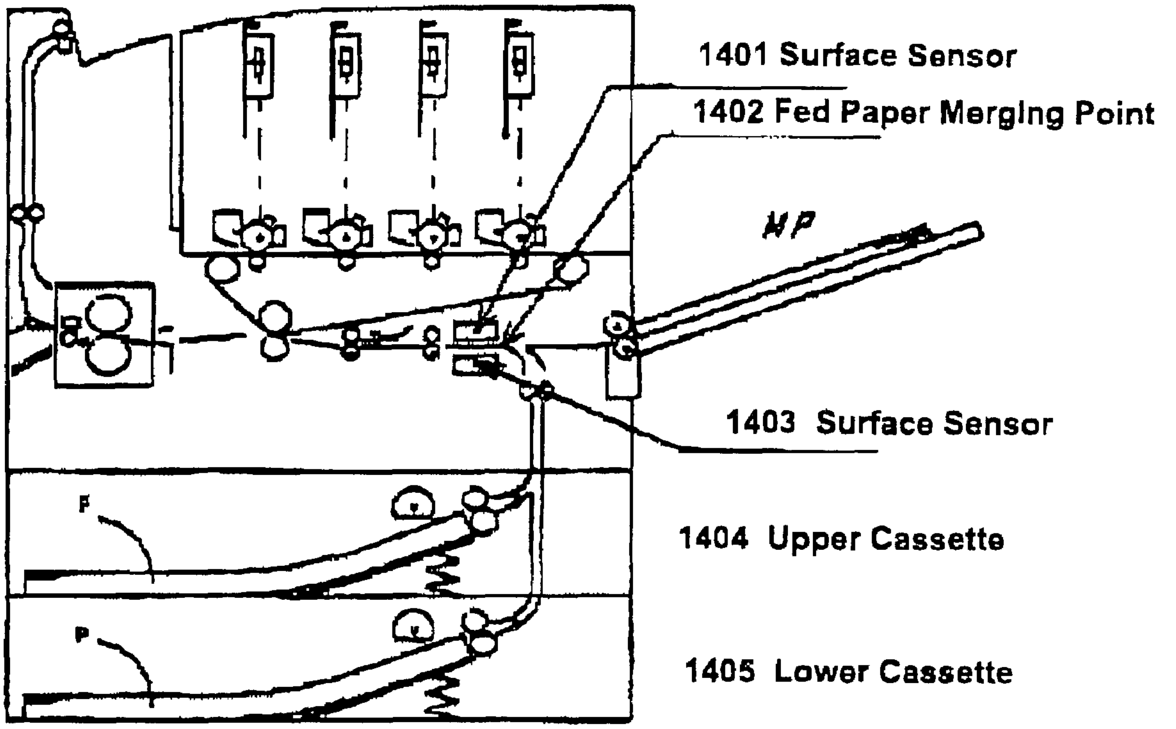
FIG. 14 shows a cross section of a color image forming apparatus, an image forming apparatus in accordance with a fourth embodiment the present invention.

Next, a forth embodiment of the present invention will be described with reference to FIG. 14. FIG. 14 illustrates an image forming apparatus that is further developed from the one described in the first-third embodiment. It is noted that the image forming apparatus and the system for the image forming apparatus in the forth embodiment are quipped with the structure and process operations substantially similar to those explained in FIGS. 2, 3, and 5–13.

Recognition devices 1401 and 1403 in FIG. 14 identify recording material determination sections 130. The recognition devices 1401 and 1403 are structured to identify recording material determination sections no matter how the recording materials are placed in the cassette with either side being the front.

Furthermore, the image forming apparatus in FIG. 14 can handle situations where recording material determination sections 130 are recorded on both sides of recording materials. The image forming apparatus in FIG. 14 may also equipped with a function to process advertisement insert controls such as recording advertisement on both sides of the recording materials.

In addition, recording materials of users' choice may be stored in an upper cassette 1404 and a lower cassette 1405, and various types of recording materials with different sizes, qualities and purposes can be stored.

Also, the a fed paper merging point 1402 is provided in paper feed paths. Recording materials are transferred and pass the fed paper merging point 1402 regardless of which one of the upper cassette 1404 and the lower cassette 1405 feeds the recording materials. And a recognition device to identify recording material determination sections 130 may be set up at the fed paper merging point 1402, such that determination can be made as to whether or not advertisement should be inserted without installing a recognition mechanism in each of the cassettes.

Figure 16:
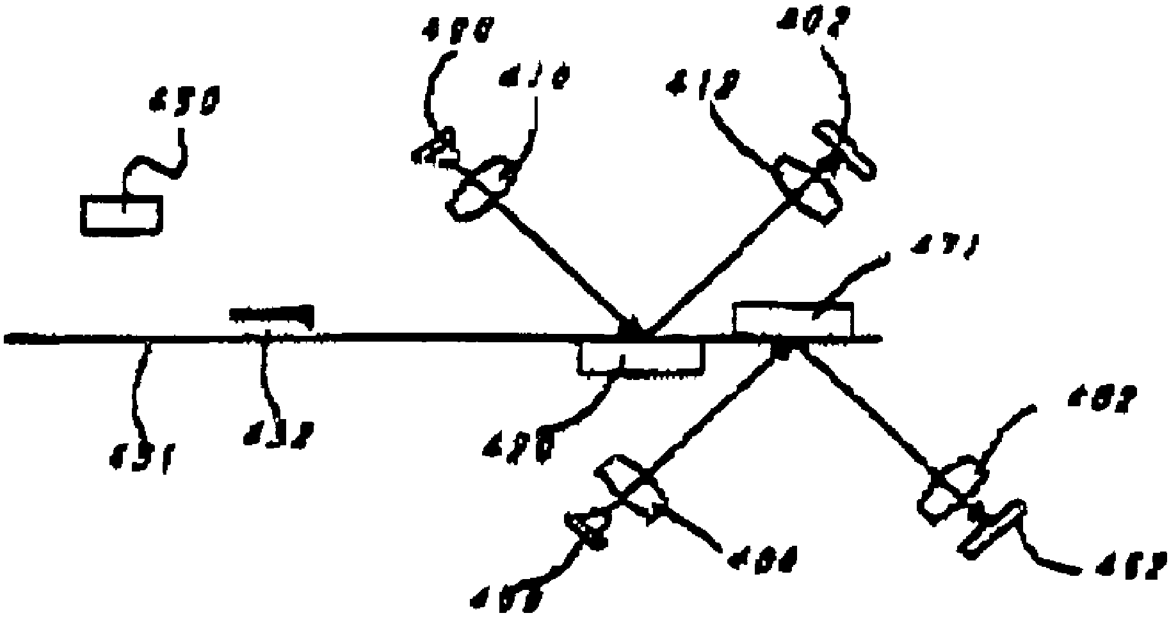
FIG. 16 schematically illustrates a recognition mechanism in the color image forming apparatus shown in FIG. 14, which recognizes recording material determination sections 130.

Next, referring to FIG. 16, a method to detect (recognize) recording material determination sections 130 with the recognition devices 1401 or 1403 will be described in detail. As noted above, advertisement-recording materials 101 may be stored in the upper cassette 1404 and/or the lower cassette 1405 with their recording material determination sections 130 facing upwardly or downwardly. Therefore, the recognition device (i.e., a front surface sensor) 1401 and the recognition device (i.e., a back surface sensor) 1403 are placed so that recording material determination sections 130 can be detected regardless of the side they are placed on, when the advertisement-recording materials 130 are supplied with the recording material determination sections 130 placed on either side.

The front surface sensor 1401 is constructed similarly to the sensor described with reference to FIG. 4. The front surface sensor 1401 may typically be constructed with a light emitting sensor 400, a light receiving sensor 402, a light projection lens 410 and a light receiving lens 412, and a reflective body 420. Also, the back surface sensor 1403 may be constructed similarly to the front surface sensor 1401. The back surface sensor 1403 is constructed with a light emitting sensor 450, a light receiving sensor 452, a light projection lens 460 and a light receiving lens 462, and a reflective body 470. The back surface sensor 1403 is placed in a front-back reversed condition with respect to the paper feed path where recording materials are transferred.

First, when an image output condition is ready after image data and the like have been transferred to the printer side, recording material 100 is supplied from, for example, the paper supply cassette 41, The recording material 100 is supplied in a direction indicated by an arrow 432 in the figure, and when it enters the paper feed path, a jamming detection sensor 430 detects that the recording material 100 has been fed.

When detection results of the jamming detection sensor 430 are recognized, infrared light is irradiated from the light emitting sensors 400 and 450. The infrared light is converged by the respective light projection lens 410 and 460, reflects on the reflective bodies 420 and 470, converged again by the light receiving lens 412 and 462, and projected to the light receiving sensors 402 and 452, respectively. During this process, the reception level detected by the respective light receiving sensors 402 and 452 is assumed to be "1", and when the recording material 100 passes through the infrared light, the respective light receiving sensors 402 and 452 detect a level difference in the amount of the reflected light, respectively.

The amount of light reflected on the recording material 100, when the color of the recording material 100 is white, is almost equal to the amount of light reflected on the reflective bodies 420 and 470. When the recording material determination sections 130 pass over both or either side of the reflective bodies 420 and 470, its reflection level becomes smaller, and a determination can be made as to whether or not the recording material 100 is an advertisement-recording material.

For outputting advertisement onto the recording materials, when either of these front and back surface sensors 1401 and 1403 detects recording material determination sections 130, images with advertisements are output. Alternatively, recording material determination sections 130 are detected on both sides of the recording material 100, advertisement images can be output on both or either side. In the case of outputting advertisements on both sides of the recording materials, printing of advertisements on both sides is possible even when an original image output instruction indicates a single surface printing.

Also, recording material determination sections 130 can be detected without having the reflective bodies 420 and 470 in this structure.

Figure 15:
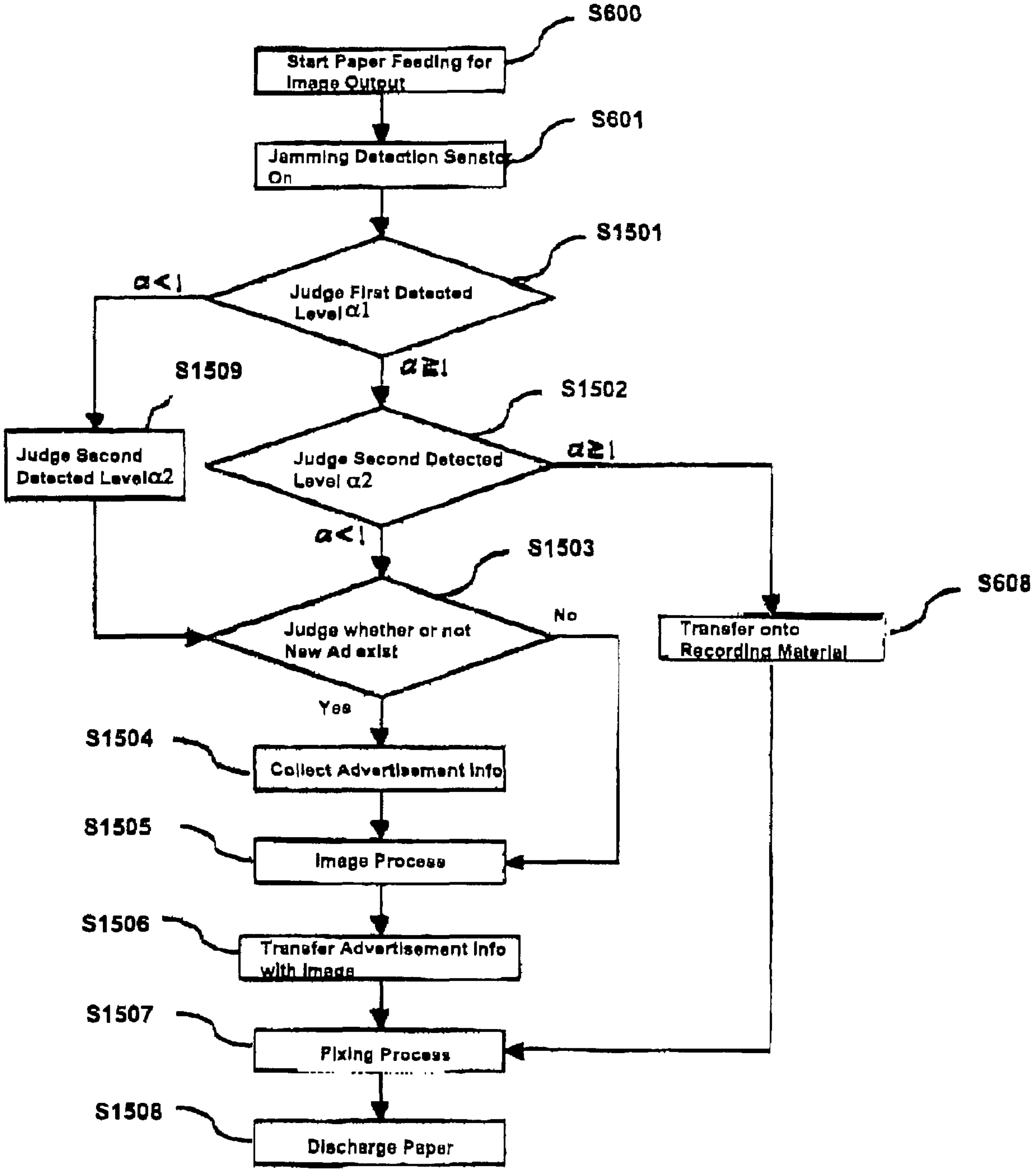
FIG. 15 is a flowchart of operations performed by the color image forming apparatus shown in FIG. 14.

FIG. 15 is a flowchart showing operations of the color image forming apparatus in FIG. 14. The flowchart shown in FIG. 15 is achieved when the CPU 201 in FIG. 2 reads programs stored in predetermined memory areas associated with this flowchart.

First, step S600 and S601 are similar to those in the first-third embodiments. The supply of recording material 100 is, however, performed from either of the upper cassette or the lower cassette in FIG. 14.

The first detection level α is determined at step S1501. In other words, as FIG. 16 illustrates, either of the recognition mechanisms determines whether or not the recording material 100 is an advertisement-recording material 101. Then, if the detection level α1 is smaller than "1," the process proceeds to step S1509, and the second detection level α2 is determined at step S1509.

On the other hand, when the detection level α1 is equal to or more than "1" at step S1501, the second detection level α2 is determined at step S1502. It is noted that the determination of the second detection level α2 is conducted by a different recognition device from that used for the first detection level α1.

When the second detection level α2 is determined to be equal to more than "1" at step S1502, the process proceeds to step S608. Details of the process at step S608 are the same as those in the first-third embodiments.

If the second detection level α2 is smaller than "1" at step S1502, the process is moved to step S1503.

Step S1503 determines the presence of new advertisements. If there is a new advertisement, the process proceeds to step S1504, and new advertisement information will be collected.

The process at step S1503 will be describe in greater detail. In step S1503, a determination is made for the existence of new advertisements corresponding to the first detection level α1 and the second detection level α2. In other words, when α1<1 and α2<1, a determination is made for the existence of new advertisements corresponding to the recording material surfaces with α1 and α2, and when α1<1 and α2≧1, a determination is made for the existence of new ads corresponding to the recording material surface with α1. Also, when α1≧1 and α2<1, a determination is made for the existence of new ads corresponding to the recording material surface with α2. Advertisement information corresponding to the determination made at S1503 is collected at step S1504.

After collecting the advertisement information, images are processed at step S1505, images and the advertisement information are transferred onto advertisement-recording material 101 at step S1506. The transferred images and advertisement information are subject to a fixing process, and the advertisement-recording material 101 is discharged at step S1508, and the process is complete.

In the above example, steps S1501, S1502 and S1059 detect the reflection level. However, bar-codes may be provided at the recording material determination sections 130 and the recognition devices may be set up to recognize the bar-codes.

In addition, in the above example, the determination process at steps S1301, S1502, and S1509 perform determinations using the two recognition devices. However, one recognition device may be provided and recording material determination sections 130 recorded either the front or back of the recording material may be detected by a different paper feeding system that is capable of reversing the front and back surface of the recording material such that the single recognition device can perform recognition twice on the front and back surfaces of the recording material.

As explained above, according to the flowchart in FIG. 15, a recognition can be made for recording material determination sections 130 regardless of which side of the surface of the recording materials faces, upwardly or downwardly. Also, no matter how the recording material determination sections are placed, upwardly or downwardly, by the user when storing recording materials, the recording material determination sections 130 can still be accurately recognized.

By implementing the mechanism described above, in exchange for placing advertisements of advertisers in a part of recording materials, recording materials can be obtained at no or lower cost.

As described above, the present invention makes it possible to identify if recording materials stored in a paper cassette of an image forming apparatus are recording materials for recording images based on image information, which are advertisement-recording materials for which advertisers pay all or part of the cost, or if recording materials are those users purchased at a regular price. If it identifies that the recording materials are for recording the image information, images based of the advertisement information designated by advertisers are placed (recorded, printed, etc.) on the recording materials as images based on image information.

Image information can be sent via a network such as the Internet to unspecified image forming apparatuses. As the image forming apparatuses can receive various image information, advertises can perform a wider range of advertising activities.

Accordingly, users can obtain recording materials at no or lower cost in exchange for placing images according to the advertisement information of advertisers in the obtained recording materials.

Furthermore, advertisers can advertise their advertisement information to users by bearing the cost of recording materials.

In addition, by specifying the provider of recording materials on which image information is recorded, if the provider is an advertiser of the advertisement, the advertiser can perform its advertising activities more effectively with its users.

Also, where the image information is an advertisement information and the provider of the image information is an advertiser of the advertisement information, the advertiser can specify multiple advertisements of the advertiser simultaneously, to thereby perform more effective advertising activities as it can present to its users various advertisement information obtained through the networks.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An output control apparatus for forming an image on recording material which includes a regular printing area and a margin area, comprising:

an input device that inputs first image information in response to an image forming instruction;

a paper supply device that supplies recording material from a paper feed section;

a recognition device that recognizes, in response to supplying of the recording material by the paper supply device, at least one recording material determination section on the supplied recording material before the image is formed on the recording material;

an acquisition device that acquires second image information based on a recognition result from the recognition device;

an image controlling device that forms a first image in the regular printing area on the recording material based on the first image information input by the input device and a second image in the margin area on the recording material based on the second image information acquired by the acquisition device, and a detection device that detects as to whether not the second image information has been renewed, wherein, when a detection is made by the detection device that the second image information has been renewed, the acquisition device obtains second information stored in an external server through a network, and the image controlling device forms an image based on the obtained second information on the recording material, and when a detection is not made by the detection device that the second image information has been renewed, the image controlling device forms an image based on information that has already been obtained on the recording material.

2. An output control apparatus for forming an image on recording material which includes a regular printing area and a margin area, comprising:

an input device that inputs first image information in response to an image forming instruction;

a paper supply device that supplies recording material from a paper feed section;

a recognition device that recognizes, in response to supplying of the recording material by the paper supply device, at least one recording material determination section on the supplied recording material before the image is formed on the recording material;

an acquisition device that acquires second image information based on a recognition result from the recognition device; and an image controlling device that forms a first image in the regular printing area on the recording material based on the first image information input by the input device and a second image in the margin area on the recording material based on the second image information acquired by the acquisition device, wherein the at least one recording material determination section includes information that specifies at least one providing source of the image information, and the acquisition device acquires the second image information for the specified at least one providing source of the image information based on the information to specify the at least one provider of the image information.

3. An output control apparatus for forming an image on recording material which includes a regular printing area and a margin area, comprising:

an input device that inputs first image information in response to an image forming instruction;

a paper supply device that supplies recording material from a paper feed section;

a recognition device that recognizes, in response to supplying of the recording material by the paper supply device, at least one recording material determination section on the supplied recording material before the image is formed on the recording material;

an acquisition device that acquires second image information based on a recognition result from the recognition device;

an image controlling device that forms a first image in the regular printing area on the recording material based on the first image information input by the input device and a second image in the margin area on the recording material based on the second image information acquired by the acquisition device, wherein the at least one recording material determination section comprises a plurality of recording material determination sections formed on both surfaces of the recording material, and the recognition device recognizes the recording material determination sections formed on at least one of the surfaces of the recording material.

4. An output control method for forming an image on recording material which includes a regular printing area and a margin area, comprising:

an input step of inputting first image information in response to an image forming instruction;

a supplying step of supplying recording material from a paper feed section;

a recognition step of recognizing, in response to supplying of the recording material by the paper supply device, at least one recording material determination section on the supplied recording material before the image is formed on the recording material;

an acquiring step of acquiring second image information based on a recognition result obtained in the recognizing step; and an image controlling step of forming a first image in the regular printing area on the recording material based on the first image information output in response to an image forming instruction and a second image in the margin area on the recording material based on the second image information acquired in the acquiring step, wherein the at least one recording material determination section includes a plurality of recording material determination sections formed on both surfaces of the recording material, and the recognizing step recognizes the recording material determination sections formed on at least one of the surfaces of the recording material.

5. An output control apparatus for forming an image on recording material which includes a regular printing area and a margin area, comprising:

an input device that inputs first image information in response to an image forming instruction;

a paper supply device that supplies recording material from a paper feed section;

a recognition device that recognizes, in response to supplying of the recording material by the paper supply device, at least one recording material determination section on the supplied recording material before the image is formed on the recording material;

an acquisition device that acquires second image information based on a recognition result from the recognition device; and an image controlling device that forms a first image in the regular printing area on the recording material based on the first image information input by the input device and a second image in the margin area on the recording material based on the second image information acquired by the acquisition device, wherein the recognition device recognizes that at least one recording material determination section each time the paper supply device supplies recording material, and wherein the image controlling device forms the first image in the regular printing area based on the first image information without forming the second image when the recognition device does not recognize the at least one recording material determination section.

6. An output control method for forming an image on recording material which includes a regular printing area and a margin area, comprising:

an input step of inputting first image information in response to an image forming instruction;

a supplying step of supplying recording material from a paper feed section;

a recognition step of recognizing, in response to supplying of the recording material by the paper supply device, at least one recording material determination section on the supplied recording material before the image is formed on the recording material;

an acquiring step of acquiring second image information based on a recognition result obtained in the recognizing step; and an image controlling step of forming a first image in the regular printing area on the recording material based on the first image information output in response to an image forming instruction and a second image in the margin area on the recording material based on the second image information acquired in the acquiring step, wherein the recognition step recognizes that at least one recording material determination section each time the recording material is supplied, and wherein the image controlling step forms the first image in the regular printing area based on the first image information without forming the second image when the recognition step does not recognize the at least one recording material determination section.

* * * * *

UNITED STATES PATENT AND TRADEMARK OFFICE

CERTIFICATE OF CORRECTION

PATENT NO. : 7,184,180 B2
APPLICATION NO. : 10/172702
DATED : February 27, 2007
INVENTOR(S) : Ichiro Yasumaru It is certified that error appears in the above-identified patent and that said Letters Patent is hereby corrected as shown below:

COLUMN 2:
Line 62, "embodiment" should read --embodiment of--.

COLUMN 4:
Line 61, "detection, device" should read --detection device,--.

COLUMN 5:
Line 28, "devises" should read --devices--.

COLUMN 7:
Line 34, "feeing" should read --feeding--.

COLUMN 8:
Line 17, "obtains" should read --obtain--.
Line 51, "has" should read --have--.

COLUMN 10:
Line 12, "refection" should read --reflection--.

COLUMN 11:
Line 9, "shorten" should read --shortened--.
Line 11, "were" should read --was--.
Line 52, "are" should read --is--.
Line 63, "detects" should read --detect--.

COLUMN 12:
Line 64, "serve" should read --server--.

COLUMN 15:
Line 62, "this type" should read --these types--.

COLUMN 16:
Line 41, "apparatuses" should read --apparatus--.
Line 52, "materials" should read --materials as in--.

COLUMN 18:
Line 6, "apparatuses" should read --apparatus in--.
Line 67, "are" should read --is--.

UNITED STATES PATENT AND TRADEMARK OFFICE

CERTIFICATE OF CORRECTION

PATENT NO. : 7,184,180 B2

APPLICATION NO. : 10/172702
DATED : February 27, 2007
INVENTOR(S) : Ichiro Yasumaru It is certified that error appears in the above-identified patent and that said Letters Patent is hereby corrected as shown below:

COLUMN 19:
Line 1, "are" should read --is--.
Line 59, "embodiment." should read --embodiments.--.
Line 61, "quipped" should read --equipped--.

COLUMN 20:
Line 7, "also" should read --also be--.
Line 16, "and" should be deleted.
Line 17, "pass" should read --past--.
Line 55, "41," should read --41.--.

COLUMN 21:
Line 61, "describe" should read --described--.

COLUMN 22:
Line 15, "S1059" should read --S1509--.
Line 21, "S1301," should read --S1501,--.
Line 24, "recorded" should read --recorded on--.
Line 59, "advertises" should read --advertisers--.

COLUMN 23:
Line 47, "whether" should read --whether or--.

Signed and Sealed this

Eleventh Day of September, 2007

JON W. DUDAS
*Director of the United States Patent and Trademark Office*